United States Patent
Fukuyama et al.

(10) Patent No.: US 6,404,719 B1
(45) Date of Patent: Jun. 11, 2002

(54) DISC RECORDING AND/OR REPRODUCING APPARATUS

(75) Inventors: Yutaka Fukuyama; Shinji Ito; Atsushi Takamatsu, all of Tokyo (JP)

(73) Assignee: Sony Corporation, Tokyo (JP)

( * ) Notice: Subject to any disclaimer, the term of this patent is extended or adjusted under 35 U.S.C. 154(b) by 1466 days.

(21) Appl. No.: 08/625,834

(22) Filed: Apr. 1, 1996

Related U.S. Application Data

(60) Continuation of application No. 08/379,711, filed on Jan. 27, 1995, now abandoned, which is a division of application No. 08/187,291, filed on Jan. 26, 1994, now abandoned.

(30) Foreign Application Priority Data

Jan. 29, 1993 (JP) .............................................. 5-034455

(51) Int. Cl.$^7$ .............................................. G11B 5/008

(52) U.S. Cl. ..................................................... 369/77.2

(58) Field of Search .............................. 242/338, 333.4; 360/96.5, 93, 99.02, 99.03, 99.06, 99.07; 369/75.1, 75.2, 77.1, 77.2, 247, 263

(56) References Cited

U.S. PATENT DOCUMENTS

| | | | | |
|---|---|---|---|---|
| 4,530,081 A | * | 7/1985 | Sakurai et al. | 369/75.1 |
| 4,642,714 A | * | 2/1987 | Miyamoto | 360/96.05 |
| 4,651,246 A | * | 3/1987 | Becker | 360/99.02 |
| 4,772,965 A | | 9/1988 | Kato et al. | 360/71 |
| 4,794,588 A | * | 12/1988 | Yoshitoshi et al. | 369/263 |
| 4,901,174 A | | 2/1990 | Saito et al. | 360/99.06 |
| 4,918,549 A | * | 4/1990 | Katono et al. | 360/93 |
| 4,922,478 A | * | 5/1990 | Verhagen | 369/247 |

(List continued on next page.)

FOREIGN PATENT DOCUMENTS

| | | | |
|---|---|---|---|
| DE | 3644284 A1 | 6/1987 | |
| EP | 0 307 917 | 3/1989 | |
| EP | 0 439 286 A3 | 7/1991 | |
| EP | 0 475 595 A2 | 3/1992 | |
| EP | 0 482 585 A3 | 4/1992 | |
| EP | 0506054 A2 | 9/1992 | |
| JP | 58212653 | 1/1983 | |
| JP | 58-94160 | * 6/1983 | ................ 360/96.5 |

(List continued on next page.)

Primary Examiner—Brian E. Miller
(74) Attorney, Agent, or Firm—Oblon, Spivak, McClelland, Maier & Neustadt, P.C.

(57) ABSTRACT

A recording and/or reproducing apparatus for a magneto optical recording medium housed within a disc cartridge includes a casing, a recording and/or reproducing unit, a transporting unit and a driving unit. The casing includes an opening for introducing and ejecting the disc cartridge. The recording and/or reproducing unit includes a magnetic head for applying a perpendicular magnetic field on the magneto-optical recording medium and is housed within the casing. The transporting unit loads the disc cartridge inserted via the opening on the recording and/or reproducing unit. The transporting unit includes a holding section for holding the inserted disc cartridge and a pair of cam members for moving the holding section in the horizontal direction in the casing and in the vertical direction in the casing in continuation to the movement in the horizontal direction. The driving unit causes the cam members to be moved in the horizontal direction in the casing. The cam members are moved in a first direction as a result of insertion of the disc cartridge and set the driving unit into operating states as a result of insertion of the disc cartridge. The cam members cause the holding section to be moved in the horizontal direction by a movement of the cam members in a second horizontal direction consecutive to the movement in the first horizontal direction by the driving unit. The cam members cause the holding section to be loaded on the recording and/or reproducing unit by a movement of the cam members in a third horizontal direction consecutive to the movement in the second horizontal direction by the driving unit.

4 Claims, 25 Drawing Sheets

U.S. PATENT DOCUMENTS

| | | | |
|---|---|---|---|
| 5,050,022 A | * 9/1991 | Aizawa | 242/338.4 |
| 5,062,099 A | * 10/1991 | Odawara et al. | 369/263 |
| 5,123,004 A | 6/1992 | Arai | 369/75.2 |
| 5,164,935 A | 11/1992 | Shimegi et al. | 369/77.2 |
| 5,166,918 A | * 11/1992 | Kamijo | 369/77.1 |
| 5,184,342 A | 2/1993 | Ishii | 369/100 |
| 5,196,972 A | * 3/1993 | Matsumaru et al. | 360/96.5 |
| 5,220,552 A | * 6/1993 | Yokoi et al. | 360/99.02 |
| 5,301,178 A | 4/1994 | Okabe et al. | 369/77.1 |
| 5,345,351 A | * 9/1994 | Krohn | 360/96.5 |
| 5,379,990 A | * 1/1995 | Ando et al. | 369/247 |
| 5,383,072 A | * 1/1995 | Lee | 360/96.5 |
| 5,430,587 A | * 7/1995 | Engan | 360/96.5 |

FOREIGN PATENT DOCUMENTS

| | | | | |
|---|---|---|---|---|
| JP | 1-116953 | * | 5/1989 | 360/96.5 |
| JP | 2-201762 | * | 8/1990 | 360/96.5 |
| JP | 3173989 | | 7/1991 | |
| JP | 3252948 | | 12/1991 | |
| JP | 4019864 | | 1/1992 | |
| JP | 4021946 | | 1/1992 | |
| JP | 4026982 | | 1/1992 | |
| JP | 4030363 | | 2/1992 | |
| JP | 4053049 | | 2/1992 | |
| JP | 4141879 | | 5/1992 | |
| WO | WO 91/07750 | | 5/1991 | |

* cited by examiner

DISC RECORDING AND/OR REPRODUCING APPARATUS

This is a continuation of application Ser. No. 08/379,711 filed on Jan. 27, 1995 now aband which is a divisional of application Ser. No. 08/187,291, filed Jan. 26, 1994 now abandoned.

BACKGROUND

1. Field of the Invention

This invention relates to a recording and/or reproducing apparatus. More particularly, the present invention relates to a recording and/or reproducing apparatus for a disc-shaped optical recording medium employed as a recording medium.

2. Background of the Invention

In EP-A-0475595, for example, there has been proposed a disc recording and/or reproducing apparatus in which information signals are adapted for being recorded on or reproduced-from a recording disc, such as a magneto-optical disc or an optical disc, employed as a recording medium.

Such disc recording and/or reproducing apparatus includes an outer casing and a disc drive mounted within the outer casing. The disc drive includes a spindle motor, an optical pickup unit, a magnetic head unit and so forth. The disc drive is adapted for recording and reproducing information signals on or from the magneto-optical disc loaded thereon. The disc drive is also adapted for reading information signals from the optical disc loaded thereon.

With the magneto-optical disc, the light beam converged by the optical-pickup unit is radiated on the disc for locally heating its signal recording layer, while a vertical external magnetic field is applied to the signal recording layer of the heated area, for recording information signals conforming to the intensity of the light beam or to the modulation of the intensity of the external magnetic field. Consequently, with this present,recording and/or reproducing apparatus, the magnetic head is kept substantially in sliding contact with the magneto-optical disc during the recording mode of recording the information signals on the magneto-optical disc in readiness for driving the optical pickup unit and for enabling the magnetic field of sufficient intensity to be applied by the magnetic head to the signal recording layer.

When reading the information signals from the magneto-optical disc or from the optical disc, the direction of polarization or the intensity of the light beam radiated by the optical pickup unit and reflected by the optical pickup unit is detected. The information signals may be reproduced by demodulating changes in the direction of polarization or in the light intensity. Consequently, when reading the information signals from the recording disc, it is unnecessary f or the magnetic head to be in sliding contact with the magneto-optical disc or the optical disc.

With the above-described disc recording and/or reproducing apparatus, it has been proposed to have the magneto-optical disc or the optical disc inserted via an inserting slit formed in the front panel of the outer casing for loading the disc on the disc drive. The disc recording and/or reproducing apparatus of this type is known as the front loading type apparatus and includes a loading unit for transporting the recording disc between the inserting slit and the disc drive. It has been proposed to have the magnetooptical disc or the optical disc housed within a disc cartridge. The disc cartridge is constituted as a thin casing for accommodating the disc therein.

The loading unit of the front loading type disc recording and/or reproducing apparatus, constituted for making use of the disc cartridge, that is the disc cartridge loading unit, includes a cartridge holder into which the disc cartridge is inserted and held therein. The cartridge holder is supported for movement in the outer casing. The cartridge holder is moved towards the disc drive by a disc moving mechanism with the disc cartridge held therein. The cartridge holder transports the disc cartridge up to a position overlying the disc drive for loading the disc cartridge on the disc drive.

Among the above-described disc recording and/or reproducing apparatus, there is such a device in which the magnetic head is kept in sliding contact with the magneto-optical disc when the latter is loaded therein, and in which the magnetic head is spaced apart from the optical disc when the latter is loaded therein.

With the disc recording and/or reproducing apparatus of this type, the disc cartridge is provided with means for deciding whether the recording disc housed therein is a magneto-optical disc or an optical disc, and the magnetic head position is controlled on the basis of the results of decision by the decision means. The decision means detects a discriminating portion formed on the disc cartridge which is in the form of a hole or recess having a different depth for the magneto-optical disc or the optical disc. The mechanism for discriminating the type of the decision means is a manually actuated micro-switch-provided on the base block of the disc drive.

However, when the magneto-optical disc is loaded in position in such disc recording and/or reproducing apparatus, the magnetic head is caused to be slidingly contacted with the magneto-optical disc not only when writing the information signals but also when reading the information signals. Consequently, the magnetic head is slidingly contacted with the magneto-optical disc to an unnecessary extent, that is at a higher frequency than the information signal writing frequency, with the result that the wear caused to the magnetic head and to the magneto-optical disc is undesirably increased.

Although it may be contemplated to discriminate whether or not the disc recording and/or reproducing apparatus is in the recording mode and to move the magnetic head based on the results of discrimination, the apparatus tends to be complicated in structure and bulky in size.

When the disc cartridge is loaded on the disc drive of the loading unit for the above-described recording and/or reproducing apparatus by way of loading, the disc cartridge is accommodated and held in the cartridge holder. Consequently, when the disc cartridge is to be removed from the disc drive so as to be discharged out of the disc recording and/or reproducing apparatus by way of unloading, it is necessary to extricate the disc cartridge outwardly from the cartridge holder.

When the unloading is terminated, the cartridge holder is housed within the outer casing of the disc recording and/or reproducing apparatus. Consequently, when the disc cartridge remains accommodated in the cartridge holder, the disc cartridge cannot be taken out of the outer casing.

With the above-mentioned loading unit, the disc cartridge is pushed out during unloading in a forward direction under the bias of a spring mounted within the cartridge holder. With the loading unit, the cartridge holder is introduced into the disc cartridge of the cartridge holder against the bias of the spring, that is as the spring is elastically deformed by the disc cartridge.

Consequently, with the above-described loading unit, smooth insertion of the disc cartridge into the cartridge holder cannot be achieved because of the elastic resistance offered by the spring.

With the loading unit, there is a risk of destruction of the disc cartridge by being thrown into open air under the bias of the spring during unloading. Besides, since the disc cartridge is discharged at a high speed during the unloading operation of the loading unit, there is a risk of destruction of a pawl member used for retaining a shutter member provided in the disc cartridge in a state of closure.

SUMMARY OF THE INVENTION

It is, therefore, an object of the present invention to provide a recording and/or reproducing apparatus for a magneto-optical disc which resolves the above-mentioned problem.

It is another object of the present invention to provide a mechanism for loading a recording medium on a recording and/or reproducing section of the recording and/or reproducing apparatus which resolves the above-mentioned problem.

According to the present invention, there is provided a recording and/or reproducing apparatus for a magneto-optical recording medium including a holder for holding the magneto-optical recording medium introduced therein and a pair of cam members having a cam groove composed of a first cam groove for moving the holder in a horizontal direction and a second cam groove continuous with the first cam groove and adapted for moving the holder in a vertical direction. The holder is movable along the cam groove in the horizontal direction and in the vertical direction in continuation to movement in the horizontal direction. The recording and/or reproducing apparatus also includes a driving unit for driving the cam members in the horizontal direction, and a recording and/or reproducing unit for recording and/or reproducing information signals on or from the magneto-optical recording medium loaded therein by the movement of the holder in the horizontal direction and in the vertical direction in continuation to the movement in the horizontal direction. The recording and/or reproducing unit has an optical pickup for radiating a light beam on the magneto-optical recording medium loaded therein and a magnetic head arranged facing the optical pickup unit with the magneto-optical recording medium in-between. The magnetic head is movable between a position proximate to the magneto-optical recording medium and a position spaced apart upwardly therefrom. The pair of cam members are adapted for shifting the magnetic head towards the position proximate to the magneto-optical recording medium by a further horizontal movement by the driving unit of the pair of cam members after loading of the holder in the recording and/or reproducing unit by the pair of cam members.

According to the present invention, there is also provided a mechanism for loading a recording medium in a recording and/or reproducing unit including a holder for holding the recording medium introduced therein, a pair of cam members having a cam groove composed of first cam groove for moving the holder in a horizontal direction and a second cam groove continuous with the first cam groove and adapted for moving the holder in a vertical direction. The holder is movable along the cam groove in the horizontal direction and in the vertical direction in continuation to the movement in the horizontal direction. The loading mechanism further includes a driving unit for driving the cam members in the horizontal direction. The cam members are moved in a first direction as a result of insertion of the recording medium. The cam members set the driving unit into operating states, as a result of insertion of the recording medium. The cam members cause the holder to be moved in a horizontal direction by a movement of the cam members in the second horizontal direction, in continuation to a movement thereof in the first horizontal direction by the driving unit. The cam members cause the holder to be loaded on the recording and/or reproducing unit by a movement of the cam members in a third horizontal direction in continuation to the movement thereof in the second horizontal direction by the driving unit.

According to the present invention, there is further provided a recording and/or reproducing apparatus for a magneto-optical recording medium housed within a disc cartridge. The apparatus includes a casing having an opening by which the disc cartridge is introduced into or ejected from the casing, a recording and/or reproducing unit housed within the casing and having a magnetic head for applying a perpendicular magnetic field to the magneto-optical recording medium, and a transporting unit for loading the disc cartridge inserted via the opening on the recording and/or reproducing unit. The transporting unit has a holder for holding the inserted disc cartridge and a pair of cam members having cam grooves for moving the holder in the horizontal direction in the casing and in the vertical direction in continuation to the movement in the horizontal direction in the casing. The transporting unit also includes a driving unit for driving the cam members in the horizontal direction in the casing. The cam members are moved in a first direction as a result of insertion of the disc cartridge. The cam members set the driving unit into operating states as a result of insertion of the disc cartridge. The cam members cause the holder to be moved in the horizontal direction by a movement of the cam members in a second horizontal direction in continuation to a movement thereof in the first horizontal direction by the driving unit. The cam members cause the holder to be loaded on the recording and/or reproducing unit by a movement of the cam members in a third horizontal direction in continuation to the movement thereof in the second horizontal direction by the driving unit.

According to the present invention, since the magnetic head is lowered by the movement of a pair of cam members after the cam members have been loaded in the recording and/or reproducing unit for the magneto-optical recording medium, the magnetic head may be lowered to a position proximate to the magneto-optical recording medium only during the recording on the magneto-optical recording medium.

According to the present invention, the holder for holding the recording medium may be lowered relative to the recording and/or reproducing unit only by the horizontal movement of a pair of cam grooves for simplifying the mechanism of loading the recording medium on the recording and/or reproducing medium.

According to the present invention, the recording medium or the disc cartridge housing the recording medium therein may be smoothly inserted into the cartridge holder as holding means. Besides, the speed of movement of the recording medium or the disc cartridge having the recording medium housed therein is suppressed during ejection of the recording medium or the disc cartridge having the recording medium housed therein to prevent damage from being inflicted on recording medium or the disc cartridge having the recording medium housed therein.

BRIEF DESCRIPTION OF THE DRAWINGS

The invention will be more readily understood with reference to the accompanying drawing, wherein.

DESCRIPTION OF THE INVENTION

Figure 1:
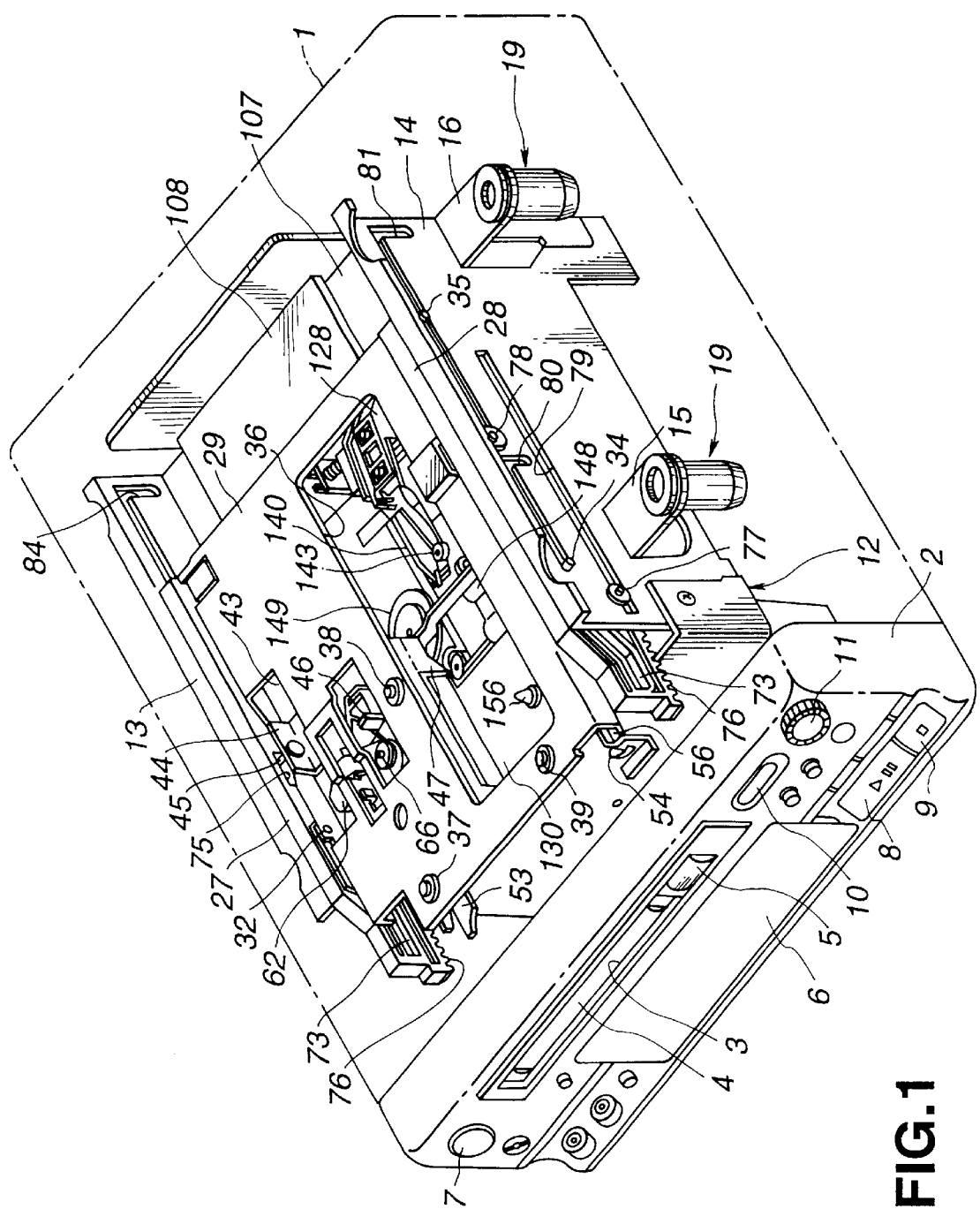
FIG. 1 is a perspective view of a disc recording and/or reproducing apparatus according to the present invention.

Referring to the drawings, preferred embodiments of the present invention will be explained in detail.

In the present embodiment, the present invention is applied to a disc recorder recording and/or reproducing information signals using the magneto-optical disc contained in a disc cartridge as a recording medium.

Outline of the Disc Recorder

The disc recorder includes a floating chassis 12 housed within an outer casing 1, as shown in FIG. 1. The outer casing 1 is made up of a main body member formed of synthetic resin or metal as a casing open on the front side, and a front panel 2 closing the open front side of the main body member. A disc cartridge inserting slit 3 is formed in the front panel 2. The inserting slit 3, closed from the inner side by a lid 4, is formed with its longitudinal axis extending in a horizontal direction. A power source button 7, an ejection button 5, a recording button 10, a playback button 8, a stop button 9, a sound volume adjustment knob 11 and a display unit 6 are arrayed on the front panel 2. These members 5 to 11 are connected to an electronic circuitry housed within the outer casing 1.

With the present disc recorder, the main power source is turned on by actuating the power source ON/OFF button 7 and the disc cartridge is inserted via the inserting slit 3 for loading on the floating chassis 12. The recording mode is selected and executed by the thrusting actuation of the recording button 10. The playback mode is selected and executed by the thrusting actuation of the playback button 8. The display unit 6 is constituted using a photocell or a liquid display device (LCD) for displaying letters, numerals or symbols for displaying the recording time duration, program number, the program name or the like. The display unit 6 is provided below the inserting slit 3.

With the present disc recorder, the portions in the outer casing 1 which play the role of a heat source, such as a power source circuit or an output circuit, are arranged at the back of the floating chassis 12. The rear side portion of the outer casing 1 in register with the heat source is formed with a large number of heat-radiating slits, not shown. Thus, with the present disc recorder, the heat generated by the heat source is prevented by the outer wall of the floating chassis 12 from being conducted towards the optical pickup unit or towards the disc cartridge on the floating chassis as will be described below.

Constitution of the Disc Cartridge

Figure 32:
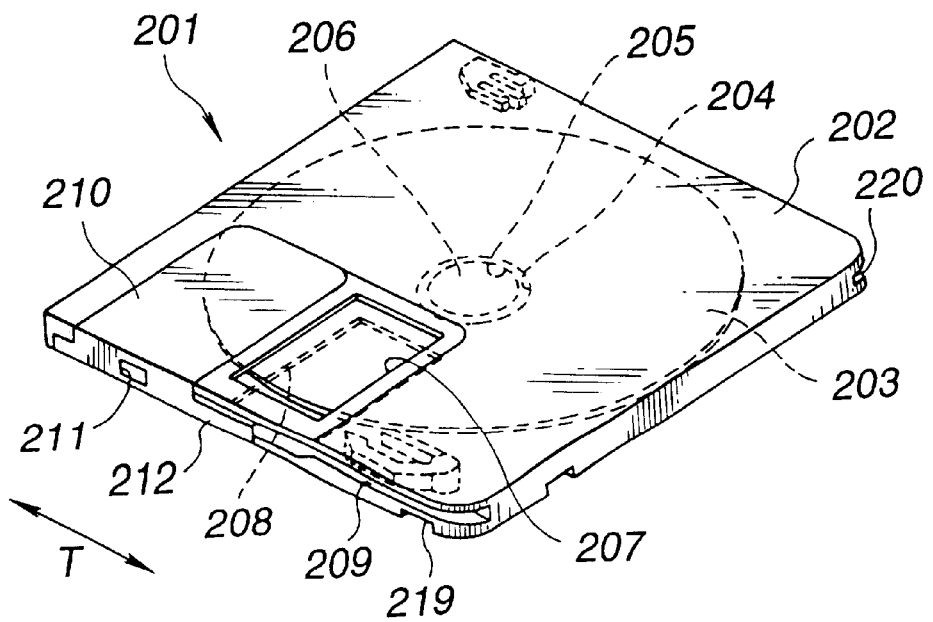
FIG. 32 is a perspective view showing the construction of the disc cartridge employed for data recording and/or reproduction among the disc cartridges employed in the disc recording and/or reproducing apparatus according to the present invention.
Figure 33:
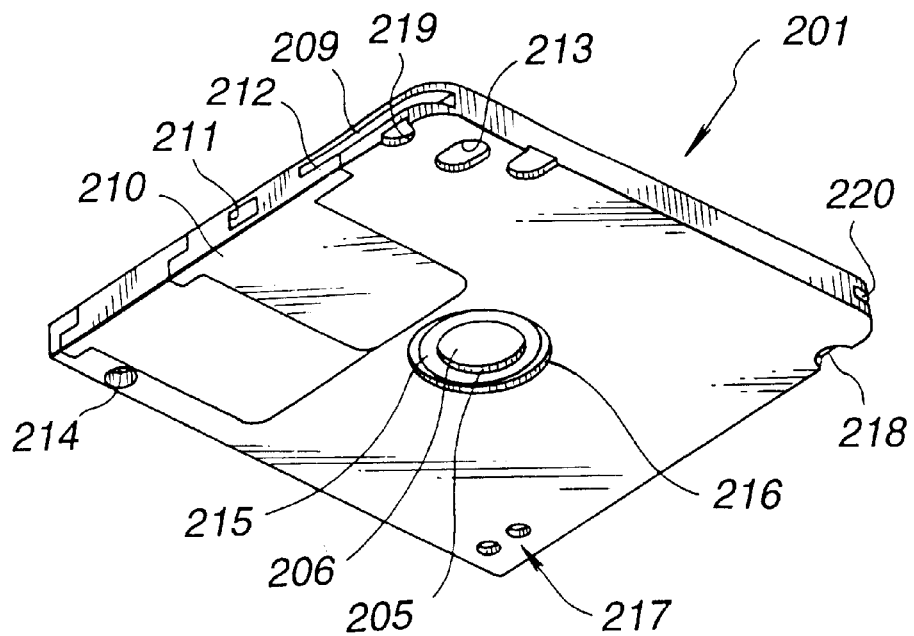
FIG. 33 is a perspective view showing the bottom side of the disc cartridge sown in FIG. 32.

The disc cartridge 201 includes a cartridge main body 202 containing a magneto-optical disc 203, as shown in FIGS. 32 and 33. The disc cartridge 201 is used for recording and/or reproducing information signals. The magneto-optical disc 203 includes a magnetic material deposited on a disc substrate. The information signals may be recorded on the magneto-optical disc 203 by locally heating the magnetic material to a temperature higher than the Curie temperature by radiation of a light beam or the like and by applying a vertical external magnetic field to the heated area of the magnetic material. The information signals may also be readout from the magneto-optical disc 203 by radiating a linearly polarized light beam as a polarized laser light beam thereon and detecting changes in the plane of polarization of the linearly polarized laser light beam due to the Kerr effect. The magneto-optical disc 203 has a center chucking opening 205 closed by a chucking plate 206.

The cartridge main body 202 is formed as a thin casing having rectangular major surfaces in correspondence with the thickness and the diameter of the magneto-optical disc 203. The upper and lower major surfaces of the cartridge main body 202 are formed with apertures 207, 208 for exposing the partial regions of the major surfaces of the magneto-optical disc 203 extending across the inner and outer rims of the disc to outside. The lower major surface of the cartridge main body 202 is formed with a chucking aperture 216 for exposing the chucking opening 205 to outside. The apertures 207, 208 may be opened or closed by a shutter member 210 slidably mounted on the cartridge main body 202. The shutter member 210 is formed by bending a thin plate-shaped member in the shape of a letter U and is adapted for closing the apertures 207, 208 by its planar shutter plate sections. The shutter member 210 is supported for sliding in the fore and aft directions by having its center web resting on a lateral edge of the cartridge main body 202, as shown by an arrow T in FIG. 32. The lateral edge of the cartridge main body 202 is formed with a groove 209 for supporting the shutter member 210. The shutter member 210 is supported by the cartridge main body 202 with a center lug 212 resting in the groove 209. The mid portion of the shutter member 210 in register with the lateral edge of the cartridge main body 202 is formed with an engaging opening 211.

The opposite side edge of the cartridge main body 202 is formed with a mistaken insertion inhibiting groove 220 which is opened forwardly on the front end face of the cartridge main body 202 and which is extended as far as the mid part of the opposite lateral edge of the cartridge main body 202.

Figure 34:
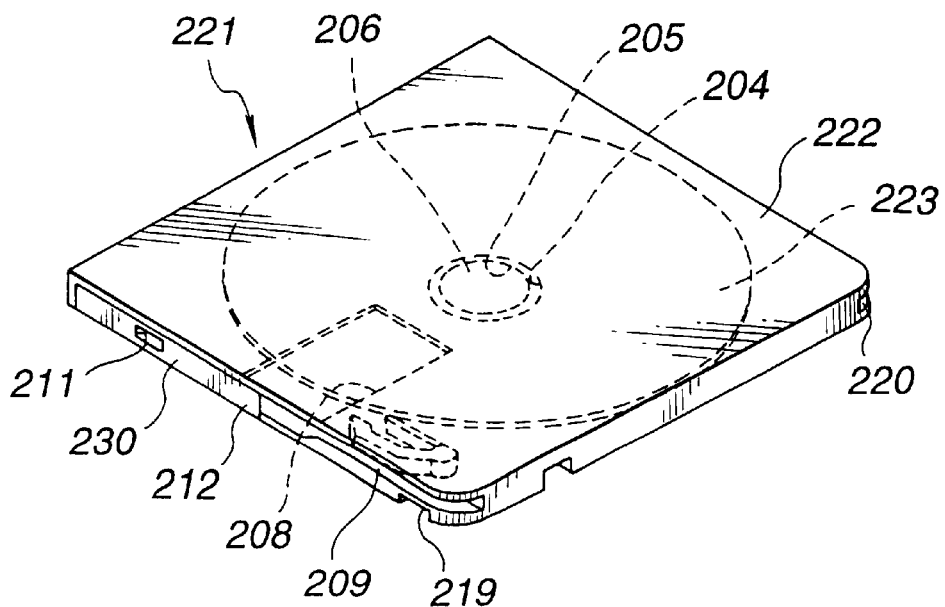
FIG. 34 is A perspective view showing the construction of the disc cartridge employed exclusively for data reproduction among the disc cartridges employed in the disc recording and/or reproducing apparatus according to the present invention.
Figure 35:
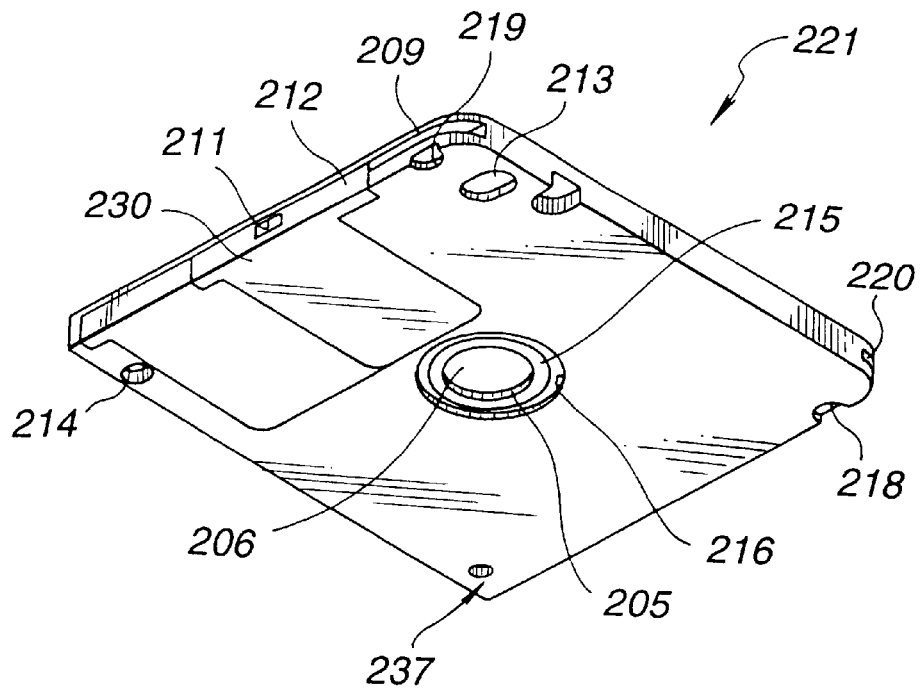
FIG. 35 is a perspective view showing the bottom side of the disc cartridge shown in FIG. 34.

The disc cartridge may also include a cartridge main body 222 accommodated in an optical disc 223, as shown in FIGS. 34 and 35. The disc cartridge 221 is used exclusively for reproducing the information signals. The optical disc 223 includes a reflecting layer of e.g. aluminum, deposited on a disc substrate, in which fine crests and troughs, that is pits, are formed in correspondence with information signals. With the optical disc 223, information signals may be read by radiating a coherent light beam, such as a laser light beam, thereon and detecting changes in the reflected light volume caused by scattering or interference by the pits of the coherent light beam. The optical disc 223 has a center chucking opening 205 which is closed by a chucking plate 206.

The cartridge main body 222 of the disc cartridge 221 is formed as a thin casing having rectangular major surfaces in correspondence with the thickness and the diameter of the optical disc 223. The lower major surface of the cartridge main body 222 is formed with an aperture 208, by means of which the portion of the signal readout lower major surface of the optical disc 223 extending across the inner and outer rims of the optical disc 223 is exposed to the outside. The lower major surface of the cartridge main body 222 is formed with a center chucking aperture 216 for exposing the chucking opening 205 to the outside. The aperture 208 may be opened or closed by a shutter member 230 slidably mounted on the cartridge main body 222. The shutter member 230 is formed by bending a thin plate-shaped member in the cross-sectional shape of a letter U and is adapted for closing the aperture 208 with its planar shutter plate section on its one side. The shutter member 230 is supported for sliding by having its opposite side resting on a lateral edge of the cartridge main body 222. The lateral edge of the cartridge main body 202 is formed with a groove 209 for supporting the shutter member 210. The shutter member 230 is supported by the cartridge main body 222 with a center lug 212 formed on its opposite lateral side resting in the groove 209. The opposite lateral side of the shutter member 230 in register with the lateral side of the cartridge main body 202 is formed with an engaging opening 211.

The opposite lateral edge of the cartridge body 222 is formed with a mistaken insertion inhibiting groove 220 which is opened forwardly on the front end face of the cartridge main body 222 and which is extended as far as the mid part of the opposite lateral edge of the cartridge main body 222.

The lower major surfaces of the cartridge main body 202, 222 of the disc cartridges 201, 221 are formed with a pair of positioning holes 213, 214 and a pair of engaging recesses 218, 219. The positioning holes 213, 214 are formed in the fore and aft direction in the inserting direction of the disc cartridge 210 or 221. The engaging recesses 218, 219 are formed on both lateral edges of the disc cartridges 201, 221 towards the foremost ends thereof in the disc cartridge inserting direction.

Each of the disc cartridges 202, 222 is so dimensioned that the distance between the bottom of the mistaken insertion inhibiting groove 220 and the bottom of the groove 209 is shorter than the disc cartridge length in the fore and aft direction in the disc cartridge inserting direction.

Supporting Structure of the Floating Chassis

Figure 6:
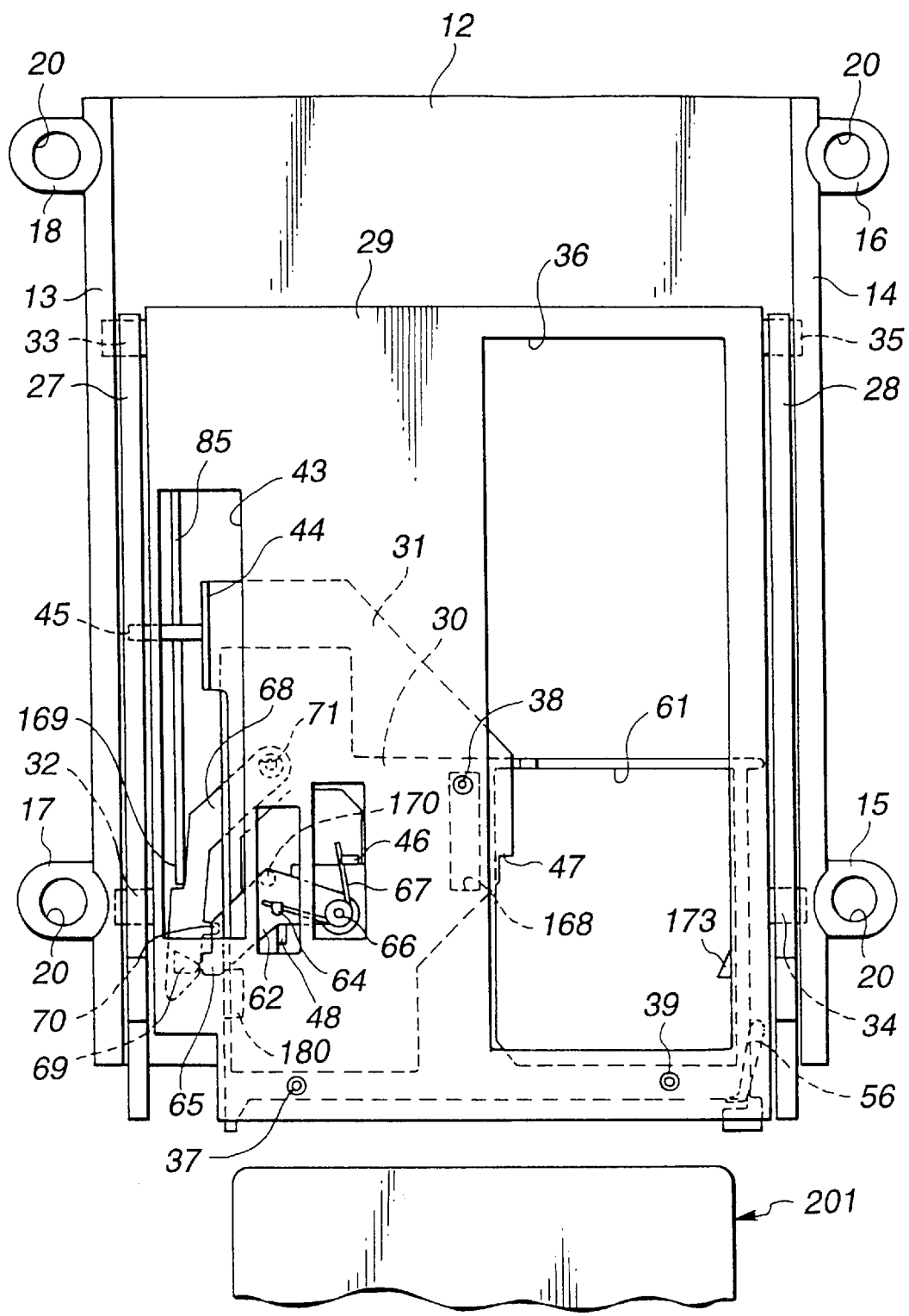
FIG. 6 is a plan view showing the structure of a disc cartridge loading unit of the disc recording and/or reproducing apparatus according to the present invention.
Figure 31:
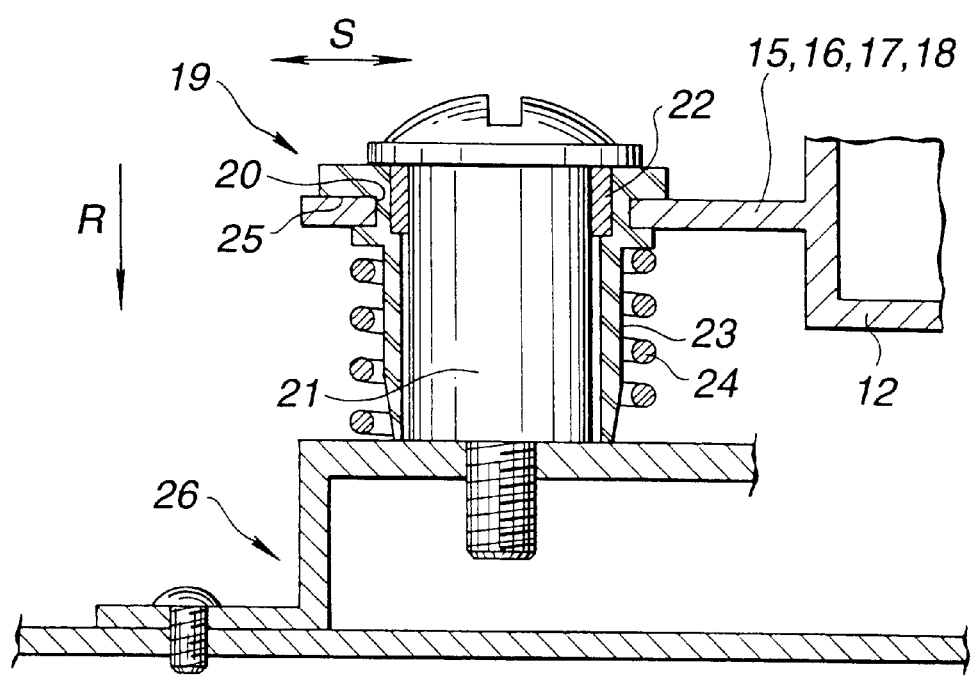
FIG. 31 is a schematic longitudinal cross-sectional view showing the construction of a damper for supporting a floating chassis of the disc recording and/or reproducing apparatus according to the present invention.

The disc recorder has the floating chassis 12 formed of a metal plate material or the like and including a horizontal plate section 107, a lateral plate section 13 and an opposite side lateral plate section 14 mounted at right angles to the horizontal plate section 107, as shown in FIG. 1. On the lateral plate supporting lugs 17 18 section 13 are formed a pair of extending outward as shown in FIG. 6. On the opposite lateral plate section 14 are formed a pair of supporting lugs 15, 16 extending outward, as shown in FIG. 6. These supporting lugs 15 to 18 are each formed with a damper receiving hole 20 in which a damper 19 is fitted as shown in FIG. 31. These four dampers 19 play the role of supporting the floating chassis 12 in a manner of being floated relative to a fixed chassis 26 fixedly mounted with the outer casing 1.

The damper 19 is made of a supporting shaft 21, having its proximal end screwed fixedly into the fixed chassis 26, a rubber tube 23 fitted on the supporting shaft 21 and a coil spring 24 wound about the supporting shaft 21. A ring member 22 formed of a low friction material, such as synthetic resin, is interposed between the supporting shaft 21 and the rubber tube 23. The inner rim of the damper receiving hole 22 is engaged with an engaging groove 25 in the distal end of the rubber tube 23 so as to be supported by the rubber tube 23.

The floating chassis 12, thus supported by the dampers 19, is prevented by the coil spring 24 and the rubber tube 23 from performing a movement in a horizontal direction which is parallel to the fixed chassis 26 shown by an arrow S in FIG. 31. The floating chassis 12 is enabled to be moved in the vertical direction normal to the fixed chassis 26 as shown by an arrow R in FIG. 31, so that the floating chassis is supported in a manner exempt from vibrations or shocks propagated thereto from outside.

Construction of the Disc Cartridge Loading Unit
(1)

Figure 2:
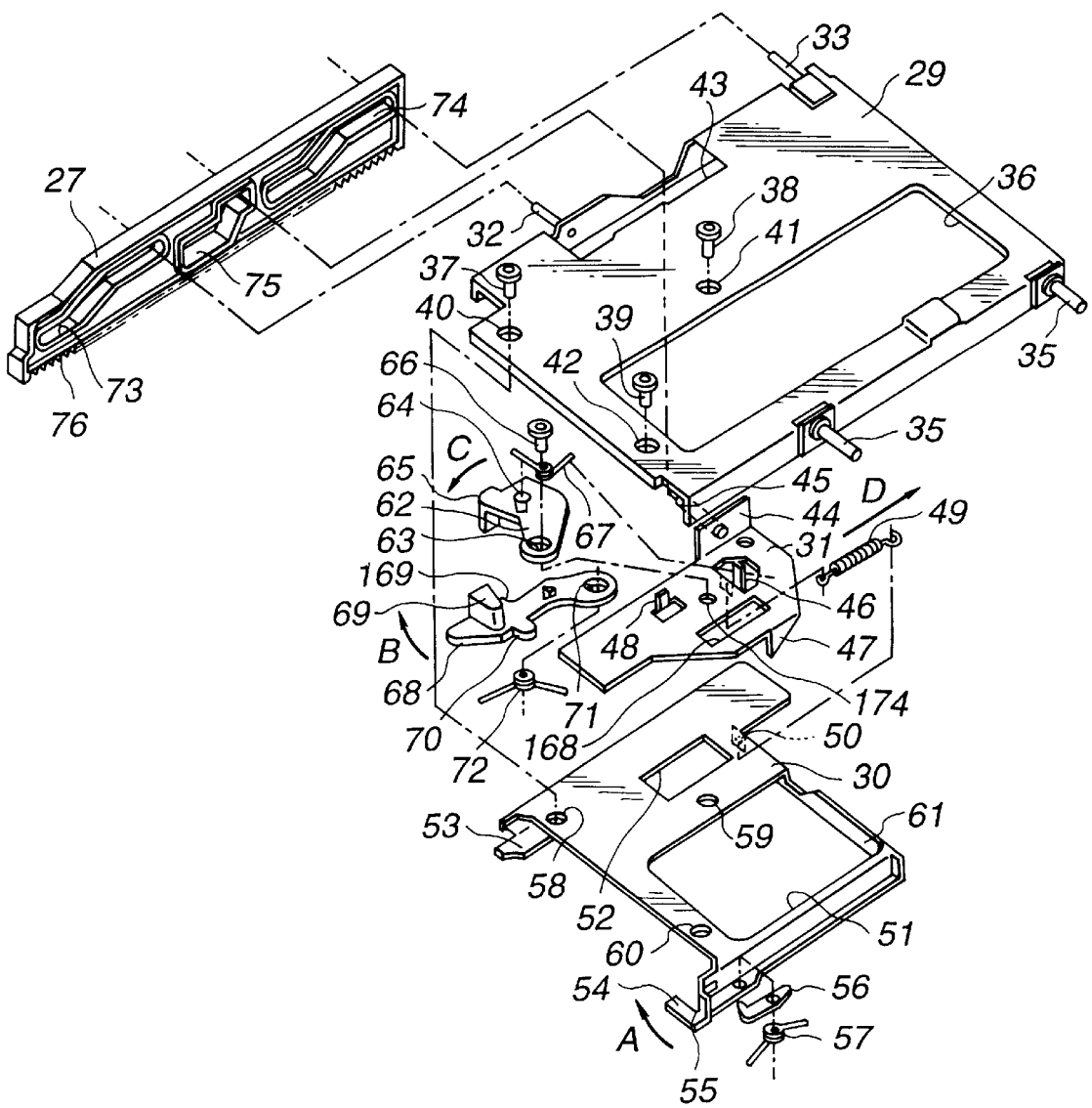
FIG. 2 is an exploded schematic perspective view of the disc recording and/or reproducing apparatus according to the present invention.
Figure 3:
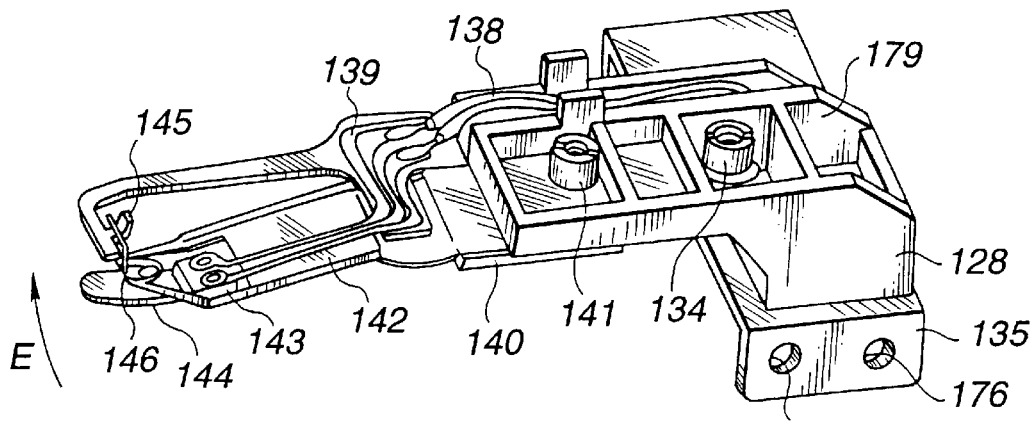
FIG. 3 is a perspective view of a supporting structure for a magnetic, head of the disc recording and/or reproducing apparatus according to the present invention.
Figure 7:
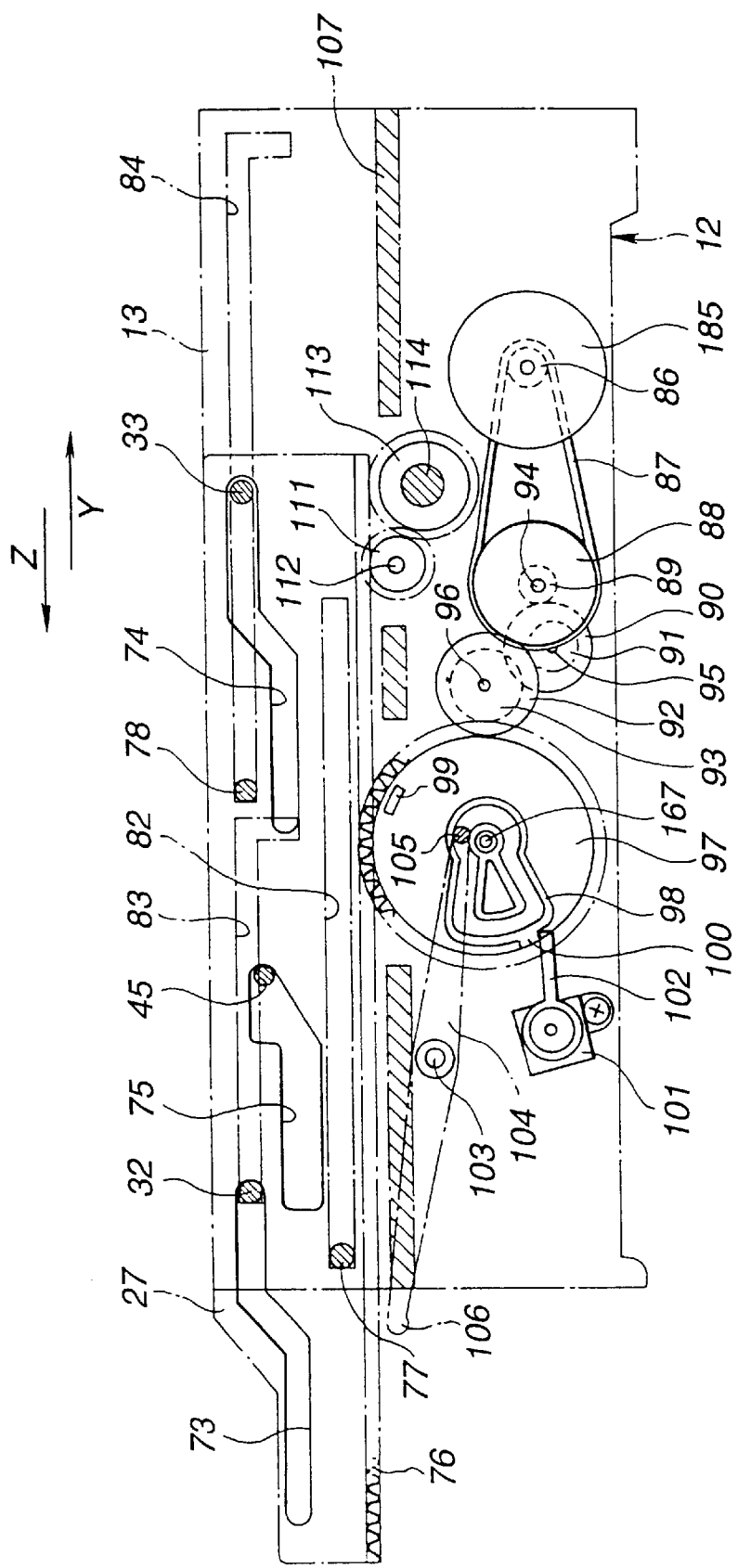
FIG. 7 is a side view showing a partial structure of one lateral side of the disc cartridge loading unit.
Figure 8:
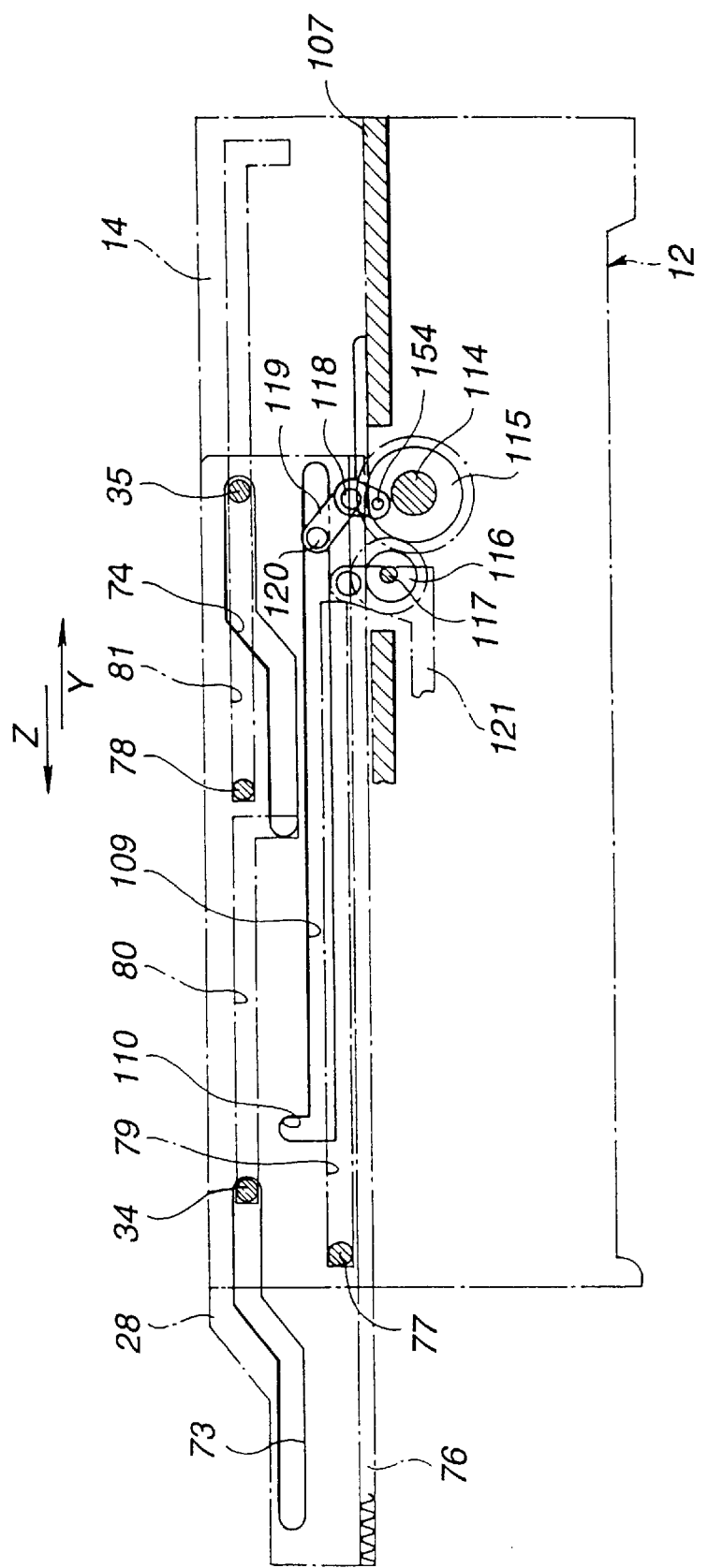
FIG. 8 is a side view showing a partial structure of the opposite lateral side of the disc cartridge loading unit.

The disc cartridge loading unit is arranged on the floating chassis 12 and includes left and right cam plates 27, 28. The left and right cam plates 27, 28 are disposed on the inner sides of the side plate sections 13, 14 above a flat plate section 107 for sliding relative to the side plate sections 13, 14, as shown in FIGS. 1 and 2. The cam plate 27 is supported by the lateral plate section 13 by having a pair of supporting pins 77, 78 passed through first and second supporting slits 82, 84 formed in the lateral plate section 13, respectively, as shown in FIG. 7. The first supporting slit 82 is linear and extends from the front and as far as the mid part of the lateral plate section 13 in the fore and aft directions. The second supporting slit 84 is similarly linear and extends from the mid part as far as the rear end of the lateral plate section 13 in the fore and aft directions and has its portion near the rear end bent perpendicularly downwards, that is towards the flat plate section 107. The opposite lateral cam plate 28 is supported by the opposite lateral plate section 14 by forward and rear supporting pins 77, 78 passed through first and second supporting slits 79, 81 formed in the lateral plate section 141 as shown in FIG. 8. The first supporting Slit 79 is also linear and extends from the front end as far as the mid part of the opposite lateral plate section 14 in the fore and aft directions. The second supporting slit 81 is linear and extends from the mid part as far as the rear end of the opposite lateral plate section 14 in the fore and aft directions and has its portion near the rear end bent perpendicularly downwards, that is towards the flat plate section 107.

Each of the cam plates 27, 28 has a forward cam groove 73, a rear cam groove 74 and a rack gear 76. The forward cam groove 73 is made up of a forward horizontal section, a rear horizontal section at a higher position than, and spaced apart from, the forward horizontal section and an inclined section interconnecting the rear end of the forward horizontal section and the forward end of the rear horizontal section. The forward cam groove 73 is formed in the forward portion of each of the cam plates 27, 28. The rear cam groove 74 is of the same contour as the forward cam groove 73 and is formed at the rear portion of each of the cam plates 27 and 28. The rack gear 76 is formed on the lower edge of each of the cam plates 27, 28 for extending from the forward end, towards the rear end of each cam plate 27, 28.

An engaging opening 75 is formed in the cam plate 27 between the cam grooves 73 and 74. The engaging opening 75 is elongated with its longitudinal axis extending in the fore and aft directions and has its rear edge formed as an inclined section substantially corresponding to the inclined sections of the cam grooves 73, 74.

A head operating cam groove 109 is formed in the rear cam plate 28 for extending from its mid portion as far as its rear end portion. The head operating cam groove 109 is linear in the fore and aft directions and has its forward end and its near-by portion bent perpendicularly upwards, that is in a direction away from the flat plate section 107, to form a head operating section 110.

Between the cam plates 27, 28 is arranged a disc loading unit made up of a loading plate 29, a cartridge holder 30 and a slide plate 31.

The loading plate 29 is formed as a flat plate substantially equal in size to the, flat plate section 107, and has both ends bent in a downward direction. On the lateral sides of the loading plate 29, that is on the downwardly bent outer lateral sides of the loading plate 29, there are protuberantly mounted left and right supporting pins 32, 33, 34, 35. The forward supporting pin 32 is introduced into the forward cam groove 73 in the lateral cam plate 27 and into a third supporting slit 83 in the lateral plate section 13. The third supporting slit 83 is extended linearly from the forward section as far as the mid part of the lateral plate section 13 in the fore and aft direction and has its rear portion bent perpendicularly downwards. The rear supporting pin 33 on one lateral side is intruded into a rear cam groove 74 in the lateral cam plate 27 and through a third supporting slit 84 in the side plate section 13. The forward side supporting pin 34 is intruded into the forward cam groove 73 in the opposite cam plate 28 and into a third supporting slit 80 in the lateral plate section 14, as shown in FIG. 8. The third supporting slit 80 is extended linearly from the forward section as far as the mid part of the lateral plate section 14 in the fore and aft directions and has its rear portion bent perpendicularly downward. The rear supporting pin 35 on the opposite lateral side is intruded into a rear cam groove 74 in the lateral cam plate 28 and through a second supporting slit 81 in the side plate section 14.

The loading plate 29 is supported by the lateral plate sections 13, 14 for sliding in the fore and aft directions via the supporting pins 32 to 35. When the cam plates 27, 28 are moved in the fore and aft directions, the loading plate 29 is moved in the fore and aft direction along the third and second supporting slits 80, 81, 83, 84. With the supporting pins 32 to 35 located at the rear ends of the third and second supporting slits 80, 81, 83, 84, the loading plate 29 is lowered in a direction of approaching the flat plate section 107.

The loading plate 29 has, on its one lateral side, a first opening 36 having a size substantially half that of the loading plate on its opposite side, while having a second opening 43 on the opposite side.

The cartridge holder 30 is formed substantially as a flat plate having a width substantially corresponding to the overall width of the loading plate 29, and is bent on either side in a hooked shape to form cartridge holding sections 53, 54, as shown in FIG. 2. These cartridge holding sections 53, 54 hold the disc cartridge 201 or 221. The cartridge holder 30 is disposed below the loading plate 29. When the disc cartridge 201 or 222 is inserted from the front side into the cartridge holder 30 the disc cartridge is held with the cartridge main body 202 or 222 of the disc cartridge 201 or 221 positioned between the major surface and the cartridge holding sections 53, 54 of the cartridge holder 30. The cartridge holder 30 is supported by being suspended relative to the loading plate 29 via supporting rods 37, 38, 39 inserted through supporting holes 40, 41, 42 formed at forward left and right and mid portions of the loading plate 29. The lower ends of the supporting rods 37 to 39 are introduced into engaging holes 58, 59, 60 formed at forward, left, right and mid portions of the cartridge holder 30. The cartridge holder 30 may be moved vertically relative to the loading plate 29 a distance on the order of the length of each of the supporting rods 37–39.

The cartridge holder 30 has an aperture 51 in register with a first aperture 36 of the loading plate 29. The cartridge holder 30 has on its rear edge a cartridge positioning wall section 61 formed by downwardly bending the rear edge of the cartridge holder 30.

The opposite side holding section 54 of the cartridge holder 30 is formed with a shutter opening pawl 173 and a shutter closing pawl 56 both directed towards the inner side of the cartridge holder 30. The shutter opening pawl 173 is integrally protuberantly formed from the lateral wall forming the holding section 54 so as to be intruded into the groove 209 of the cartridge main body 202 or 222. The shutter closing pawl 56 is the hooked forward end of a lever pivotally mounted on the lateral wall of the holding section 54, and is intruded into the inside of the cartridge holder 30 via a slit 55 formed in the lateral wall section. The shutter closing pawl 56 is biased to be intruded into, the inside of the cartridge holder 30 by a torsion coil spring 57 provided between the pawl 56 and the cartridge holder 30. The shutter closing pawl 56 is biased to be intruded into an engaging hole 211 of the shutter member 210 or 230 of the disc cartridge 201 or 221.

The holding section 53 of the cartridge holder 30 is formed with a mistaken insertion inhibiting protrusion 180 which is extended towards the inner side of the cartridge holder 30, that is in a direction facing the shutter opening pawl 173. The protrusion 180 is integrally protruded from the lateral wall of the holding section 53. When the disc cartridge 201 or 221 is introduced into the cartridge holder 36 from the forward side, the protrusion 180 is intruded into the mistaken insertion inhibiting groove 220.

The slider plate 31 is formed as a flat plate having a size substantially equal to one-half of one lateral half portion of the cartridge holder 30, and is adapted for performing a sliding movement in the fore and aft directions within a pre-set range. The slider plate 31 is arranged between the lateral quarter portion of the loading plate 29 and a lateral portion of the cartridge holder 30. The slider plate 31 is biased in a direction of being moved rearward relative to the cartridge holder 30 as indicated by an arrow $\underline{D}$ in FIG. 2 by a tension coil spring 49 provided between a spring retainer at the rear portion of the slider plate 31 and a spring retainer 50 provided on the rear end of the cartridge holder 30. Meanwhile, the tension coil spring 49 is positioned within an opening 52 formed in the lateral half portion of the cartridge holder 30.

A mating thrusting portion 47 is formed on the opposite lateral edge of the slide plate 31 by downwardly bending a part of the slide plate 31, as shown in FIG. 2. The mating thrusting portion 47 extends through an opening 51 in the cartridge holder 30 into the inside of the cartridge holder 30. In an initial state in which the slide plate 31 is located forwardly of the cartridge holder 30 against the bias of the tension spring 49, the mating thrusting portion 47 is located forwardly of the cartridge positioning wall section 61. When the slide plate 31 is moved to a position rearwardly of the cartridge holder 30, the mating thrusting portion 47 is moved to a position flush with the cartridge positioning wall section 61.

An actuating pin mounting lug 44 is formed on one lateral edge of the slide plate 31 by upwardly bending a portion of the slide plate 31. An actuating pin 45 is mounted on the lug 44 for being protruded outward. The actuating pin 45 extends through a second opening 43 of the loading plate 29 towards the cam plate 27 for being intruded into an engaging opening 75 formed in the cam plate 27.

A cartridge insertion detection arm 62 and a stop arm 68 are mounted for rotation on the slide plate 31, as shown in FIG. 2. The detection arm 62 has a mounting hole 63 on its proximal side. The detection arm 62 is mounted on the slide plate 31 by a mounting pin 66 introduced through the mounting hole 63 and introduced into a mounting hole 174 of the slide plate 31. The detection arm 62 has a terminal abutment portion 65 which is protruded at a position between the cartridge holder 30 and the cam plate 27. The detection arm 62, also has an intermediate cartridge abutment pin 170 which is protruded into the inside of the cartridge holder 30.

The detection arm 62 is rotationally biased by a torsion coil spring 67 for shifting the abutment portion 65 forwards, as shown by an arrow $\underline{C}$ in FIG. 2. The torsion coil spring 67 has its coil part wrapped around the mounting pin 66 and has its one arm retained by a spring retainer 46 mounted upright on the slide plate 30, while having its other arm retained by a spring retainer 64 mounted upright on the detection arm 62. The detection arm 62 is positioned by a retainer 48 at a position of being abutted against the retainer 48. The retainer 48 is mounted on the slide plate 31 at a position ahead of the detection arm 62.

The stop arm 68 h as a mounting hole 71 on its proximal side and is mounted on the slide plate 31 by a mounting pin which is introduced through the mounting hole 71 and into a mounting hole, formed in the slide plate 31. The stop arm 68 has on its distal side an abutment boss 69, a cartridge engaging lug 70 and a stop shoulder 169. The stop arm 68 has its distal end located between, the cartridge holder 30 and the cam plate 27 and directed forwards, as shown in FIG. 6. The abutment boss 69 is formed on the upper surface of the stop arm 68 and directed upwards. The engaging lug 70 is protruded from the lateral edge of the stop arm 68 towards the cartridge holder 30. The engaging lug 70 is intruded into the inside of the cartridge holder 30 via a notch formed in the lateral wall section of the cartridge holder 30. The stop shoulder 169 is formed on the lateral edge of the stop arm 68 directed towards the cam plate 27. This stop arm 68 is rotationally biased by a torsion coil spring 72 so that its distal end is moved towards the cam plate 27, as shown by an arrow B in FIG. 2.

When the loading plate 29 is positioned ahead of the floating chassis and the slide plate 31 is positioned ahead of the cartridge holder 30, the stop arm 68 has its stop shoulder 169 retained by the forward portion of a stop wall section 85 formed upright on the flat plate section 107, as shown in FIG. 6. As a result thereof, the slide plate 31 and the loading plate 29 are prevented from being moved rearward. The stop wall section 85 is formed on the lateral side of the flat plate section 107 for extending upwards and in the fore and aft directions.

Constitution of the Disc Drive Block

A disc drive block 147 as the disc drive is. mounted on the flat plate section 107 of the floating chassis 12, as shown in FIGS. 22 to 27. The disc drive block 147 includes a base block 130, a disc table 149, an optical pickup unit 148 and a magnetic head 143 mounted on the base block 130.

The disc table 149 is mounted on a driving shaft 155 of a spindle motor fixedly mounted on the base block 130. The disc table 149 is substantially disk-shaped and includes a disc setting portion in the form of a flat plate 150 and an upwardly directed tapered portion 151 formed at a mid part of the disc setting portion 150. A magnet (not shown) is mounted within the tapered portion 151. When the disc cartridge 201 or 221 is loaded on the base block 130, the disc table 149 is intruded via the chucking aperture 216 into the inside of the cartridge main body 202 or 222. The magneto-optical disc 203 or the optical disc 223 is centrally set on the disc table 149 intruded into the inside of the cartridge main body 202 or 222. When the magneto-optical disc 203 or the optical disc 223 is set on the disc table 149, the magnet arranged within the tapered portion 151 attracts the chucking plate 206. As a result thereof, the tapered portion 151 is intruded into the chucking hole 205 so that a setting surface section 215 around the chucking opening 205 is set on the disc setting portion 150.

Figure 26:
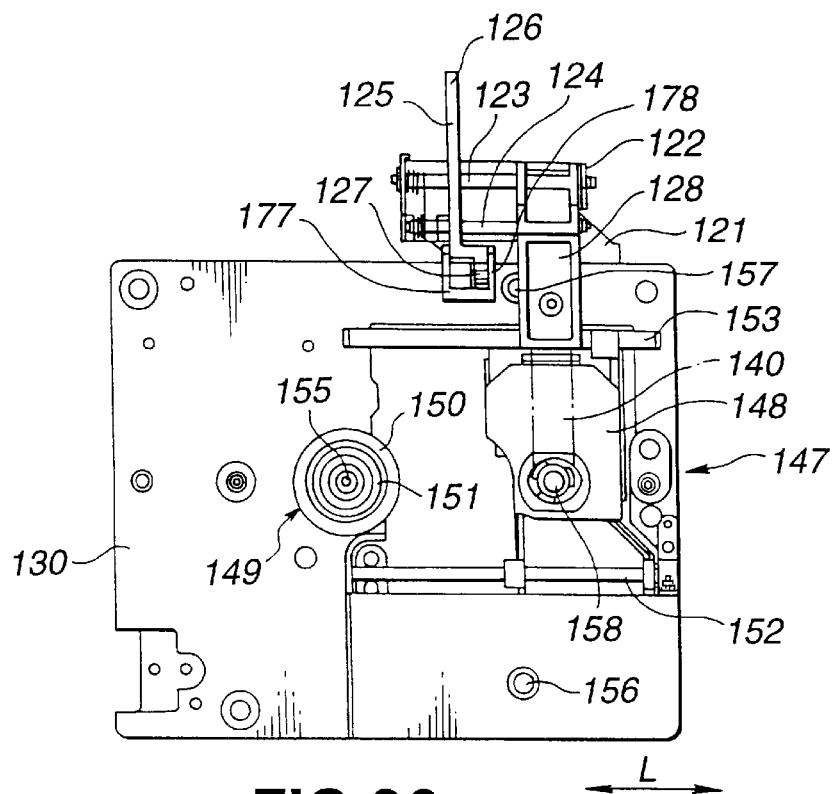
FIG. 26 is a plan view showing the construction of the disc drive according to the present invention.

The optical pickup unit 148 includes an optical block having enclosed therein a light source, such as a semiconductor laser, optical devices such as a beam splitter prism or a collimator lens, and a photodetector. The optical pickup unit 148 also includes an objective lens 158 for converging the light beam radiated by the light source. The optical pickup unit 148 detects the light converged by the objective lens 158 and reflected from the medium by the photodetector via the objective lens 158. The optical pickup unit 148 is supported by a pair of parallel guide shafts 152, 153 mounted on the base block 130 and is arranged on the opposite side of the disc table 149. Referring to FIG. 26, the optical pickup unit 148 is adapted for being moved on the base block 130 along the guide shafts 152, 153 in the left-and-right directions, that is towards and away from the disc table 149, as shown by an arrow L.

The base block 130 has a pair of positioning pins 156, 157 which are substantially conical-shaped pins tapered at the distal ends. When the disc cartridge 201 or 221 is set and loaded on the base block 130, the positioning pins 156, 157 are intruded into positioning openings 213, 214 in the disc cartridge 201 or 221 for positioning the disc cartridge 201 or, 221 relative to the base block 130. When the disc cartridge 201 or 221 is positioned by the portioning pins 156, 157, the magneto-optical disc 203 or the optical disc 223 is set and loaded on the disc table 149.

The magnetic head 143 is supported via a head arm 128 and a gimbal spring 142 on a connecting arm 121 connected to the optical pickup unit 148, as shown in FIGS. 3 to 5 and FIGS. 22 to 25. The connecting arm 121 has its proximal end mounted on the lower surface of the optical pickup unit 148 so that its distal end is protruded rearwardly from the rear edge of the base block 130. The distal end of the connecting arm 121 is formed with a pair of supporting sections 122, 131 interconnected by a supporting shaft 123. A head supporting base member 135 is mounted for rotation on the supporting shaft 123. The head supporting base 135 is formed by a flat plate member having its sides bent downwards. Both side flaps of the base member 135 are formed with through-holes 176 for supporting the supporting shaft 123 therein.

The head arm 128 has its proximal end mounted on the head supporting base member 135 by get screws 134. A supporting arm 140 has its proximal end mounted by set screws 141 on the distal end of the head arm 128. The head arm 140 is formed of metal or like material as a tapered rod. The gimbal spring 142 has its proximal end mounted on the distal end of the head arm 128 so as to be clamped between the head arm 128 and the proximal end of the supporting arm 140. The gimbal spring 142 is formed as a thin plate spring and has its distal end positioned below the distal end of the supporting arm 140. A suspension ring 146 formed at the distal end of the gimbal spring 140 is engaged by a suspension lug 145 formed at the distal end of the supporting arm 140. The magnetic head 143 is mounted on the distal end of the gimbal spring 142 via a slide member 144. The slide member 144 is formed of a low-friction material, such as synthetic resin, and is engaged with the gimbal spring 142 while sheathing the lower surface of the magnetic head 143. The magnetic head is positioned and supported on the optical axis of the objective lens 158. The magnetic head 143 generates the magnetic field using a current via a flexible substrate 139 having Its proximal side attached to the supporting arm 140. An electric cord 138 is connected to the flexible substrate for supplying the current thereto.

By the head supporting base member 135 being rotated about the supporting shaft 123, the magnetic head 143 may be moved towards and away from the magneto-optical disc 203 or the optical disc 223 loaded on the disc table 149. The head supporting base member 135 is rotationally biased by the torsion coil spring 132 arranged between the base member 135 and the supporting member 131 in a downward direction, that is in a direction of abutting the magnetic head 143 against the magneto-optical disc 203 or the optical disc 223 loaded on the disc table 149, as shown by an arrow H in FIG. 5.

Figure 27:
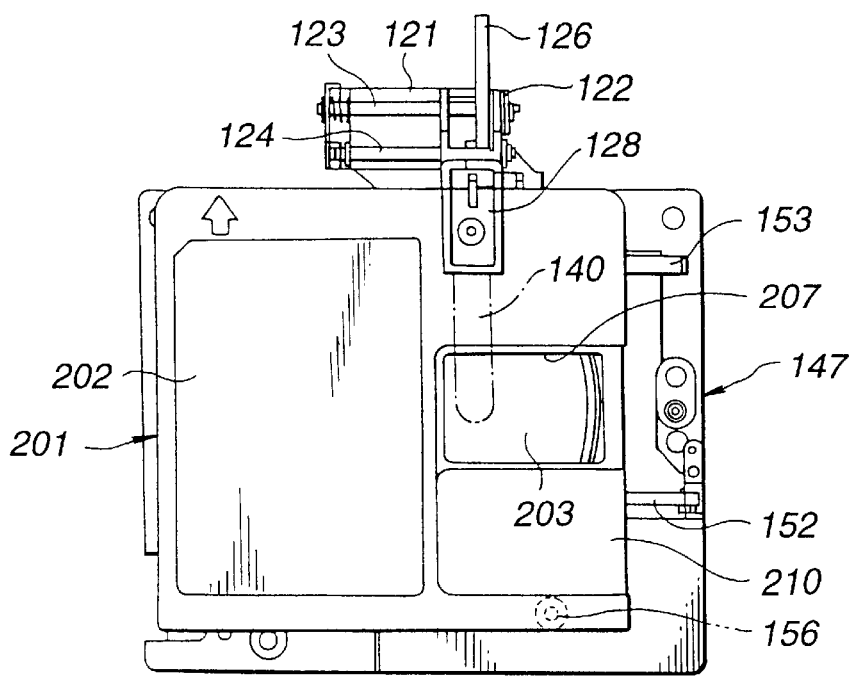
FIG. 27 is a plan view showing the state in which the disc cartridge has been transported onto the disc drive in readiness for reproduction.

A rotation producing shaft 124 is mounted on the head supporting base member 135 ahead of the supporting shaft 123. The rotation producing shaft 124 is introduced through a pair of through-holes 175 formed in the downturned portions of the lateral sides of the head supporting base member 135 in parallel with the supporting shaft 123 so as to be mounted on the head supporting base member 135. In a rotation producing arm 125, the supporting shaft 123 and the rotation producing shaft 124 is mounted by traversing the arm 125, as shown in FIG. 27. That is, the rotation producing arm 125 is formed as a rod extending in the fore and aft directions and has a through-hole traversed by the rotation producing shaft 124 and another through-hole traversed by the supporting shaft 123. The rotation producing arm 125 is adapted for moving along the supporting shaft 123 and the rotation producing shaft 124 in left and right directions relative to the head supporting base member 135. The rotation producing arm 125 has its forward side abutment portion 127 positioned above the rear edge of the base block 130 while having its rear side mating operating portion 126 protruded in the rearward direction. The rotation producing arm 125 is prevented from being moved in the left and right directions relative to the base block 130 by having its abutment portion 127 positioned between paired wall sections 177, 178 mounted in the vicinity of the rear edge of the base block 130. As the connecting arm 121 is moved along with the optical pickup unit 148 in the left and right direction, that is in a direction towards and away from the disc table 149, along with the optical pickup unit 148, the rotation producing arm 125 is moved relative to the connecting arm 121 along the supporting shaft 123 and the rotation producing shaft 124, while remaining stationary relative to the base block 130.

Figure 4:
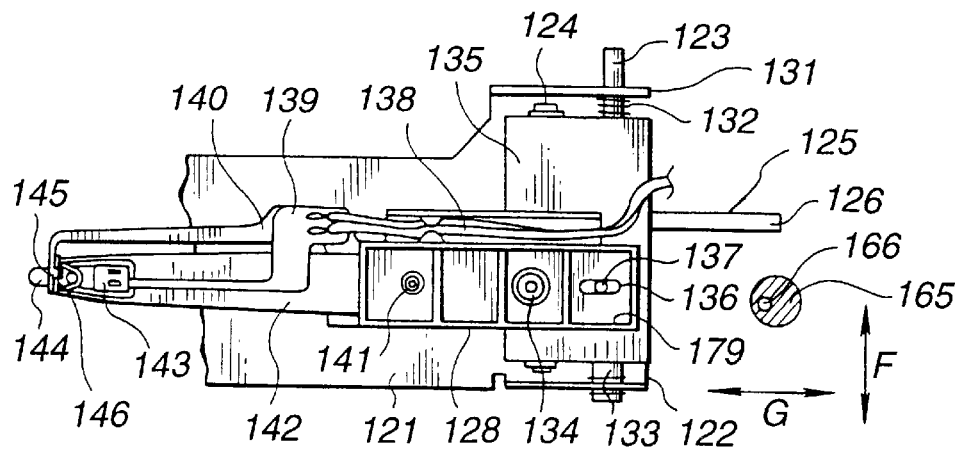
FIG. 4 is a plan view showing the supporting structure of the magnetic head.
Figure 5:
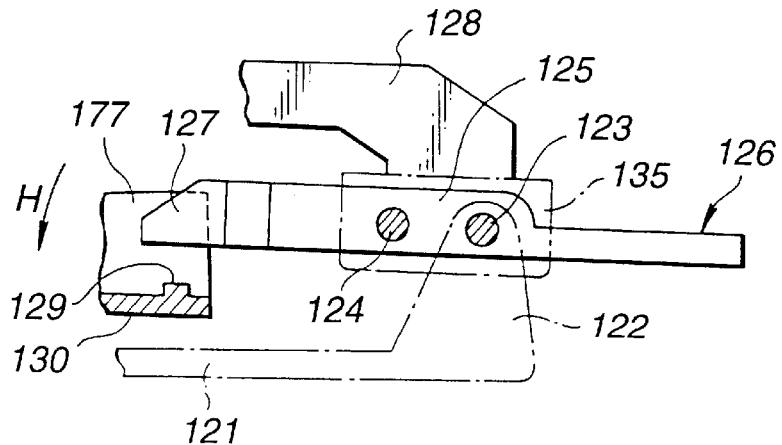
FIG. 5 is a schematic side view showing the supporting structure for the magnetic head.
Figure 22:
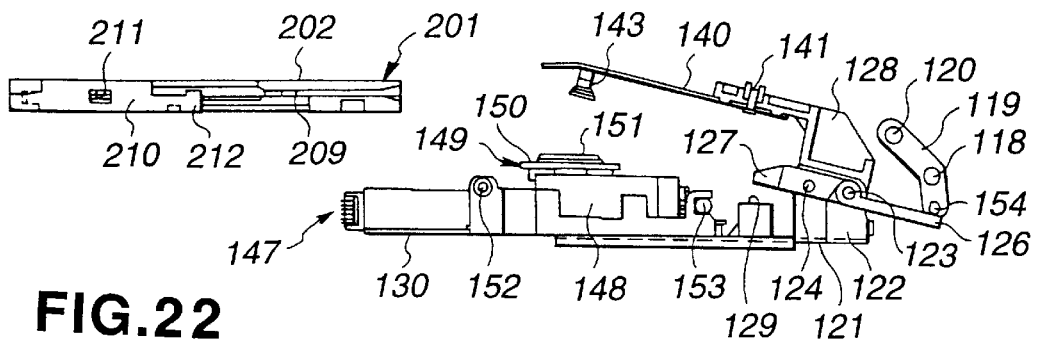
FIG. 22 is an exploded side view showing the relation between the disc cartridge and the disc drive of the disc recording and/or reproducing apparatus according to the present invention.

The rotation producing arm 125 causes the abutment portion 127 to bear against a height reference 129 provided in the vicinity of the rear edge of the base block 130, as shown in FIG. 22. This causes the head supporting base member 135 to be-positioned at a pre-set rotational position of causing the magnetic head 143 to be slidingly contacted with the magneto-optical disc 203 or the optical disc 223. When the mating operating member 126 is thrust downwards, the rotation producing arm 125 holds the head supporting base member 135 at a rotational position in which it has been, rotated against the bias of the torsion spring 132, as shown in FIG. 4. As a result thereof, the magnetic head 143 is held at a position removed from the magneto-optical disc 203 or the optical disc 223 loaded on the disc table 149.

A head lifting arm 119 is provided on the flat plate section 107, as shown in FIGS. 8, 121, 15, 18 and 21 to 25. The head lifting arm 119 has its mid portion rotatably supported on a supporting shaft 118 supported on the flat plate section 107. Furthermore, the head lifting arm 119 has on its one end a profiling protrusion 120 engaged with a head actuating cam groove 109. The head lifting arm 19 has at its other end an operating pin 154 disposed above the mating operating portion 126. If any mode other than the recording mode is selected, the head lifting arm 119 has its profiling protrusion 120 supported by the head operating cam groove 109, as shown in FIGS. 8, 12, 15, 18 and 22 to 24. In this manner, the lifting arm 119 thrusts and supports the mating operating portion 126 by its actuating pin 154 for holding the magnetic head 143 at an elevated position. When the recording mode is selected, with the cam plates 27, 28 being moved rearward, the profiling pin 120 is intruded into the head actuating section 110 for rotating the lifting arm 119 to release the thrusting of the mating operating section 126 by the actuating pin 154 for enabling the magnetic head 143 to be moved downwards, as shown in FIGS. 21 to 25.

The head arm 128 may be adjusted as to its position relative to the head supporting base member 135 in the fore and aft directions, that is in the extending direction as shown by an arrow G in FIG. 4. The proximal portion of the head arm 128 is formed with an adjustment elongated opening 136 into which is inserted an adjustment pin 137 set on the head base member 130. For adjusting the position in the fore and aft directions of the head arm 128, the set screw 134 is slightly loosened and an adjustment jig 165 is introduced into the inside of a peripheral wall section 179 surrounding the adjustment elongated opening 136. The adjustment jig 165 has a cylindrical-shaped distal end and an adjustment pin receiving hole 166 on its end face at a position offset from the center axis of the cylinder. The adjustment pin 137 is fitted into the adjustment pin receiving hole 166 and the adjustment jig 165 is rotated about its own axis, that is, about the adjustment pin 137 as the center of rotation, As a result hereof, the outer periphery of the adjustment jig 165 thrusts the inner wall of the peripheral wall section 179 for shifting the head arm 128 in the fore and aft directions along the longitudinal direction of the elongated adjustment opening 136. When the head arm 128 is at an optimum position in the fore and aft directions, the set screw 134 is tightened for completing the position adjustment of the head arm 128 in the fore and aft directions.

The head supporting base member 135 may be adjusted in its position in the left and right directions as shown by an arrow F in FIG. 4 with respect to the connecting arm 121. The head supporting base member 135 is thrust by the torsion coil spring 132 towards its opposite lateral side along the axis of the supporting shaft 123. An adjustment screw ring 133 fitted over the supporting shaft 123 is provided on the opposite lateral side of the head supporting base member 135 so as to be abutted against the head supporting base member 135. The adjustment screw ring 133 is shaped and fitted on the supporting shaft 123. The cylindrical screw ring 133 has screw threads on its outer peripheral surface by which it is engaged with the supporting lug 122. When the Adjustment screw ring 133 is rotated for changing the amount of threaded engagement thereof with the supporting lug 122, the screw ring 133 is moved along, the axis of the supporting shaft 123, that is in the left and right directions, because the head supporting base member 115 is biased by the torsion coil spring 133 into thrusting engagement with the adjustment screw ring 133. When the head supporting base member 135 is at an optimum position in the left and right directions, the adjustment screw ring 133 is halted for completing the adjustment of the head supporting base member 135 in the left and right directions.

Construction of the Disc Cartridge Loading Unit
(2)

A loading motor 185 and a plurality of transmission gears, not shown, are provided on the lateral side plate section 13, as shown in FIG. 7. A driving pulley 86 is mounted on a driving shaft of the loading motor 185. An endless driving belt 87 is placed between the driving pulley 86 and a driven pulley 88 rotatably mounted via an arbor 94 on the lateral side plate section 13. A first transmission gear 89 is mounted coaxially and as one with the driven pulley 88. The first transmission gear 88 is engaged with a second transmission gear 90 which is rotatably mounted on the lateral side plate section 13 via an arbor 95 and has a number of teeth more than that of the first transmission gear 89. A third transmission gear 91 having the number of teeth less than that of the second transmission gear 90 is mounted coaxially and as one with the second transmission gear 90. The third transmission gear 91 is engaged with a fourth transmission gear 92 which is rotatably mounted on the lateral side plate section 13 via an arbor 96 and which has the number of teeth more than that of the third transmission gear 91. A fifth transmission gear 93 having the number of teeth less than that of the fourth transmission gear 92 is mounted coaxially and as one with the fourth transmission gear 92.

The fifth transmission gear 93 meshes with teeth formed on the outer rim of a cam gear 97 rotatable mounted via an arbor 167 on the lateral side plate section 13. The teeth of the cam gear 97 are engaged with a rack gear 76 of the lateral side cam plate 27 which is moved in the fore and aft directions by the driving force of the loading motor 185 as indicated by arrows Z and Y in FIG. 7.

A first connection gear 111 rotatably supported by the lateral side plate section 13 via an arbor .112 is engaged with the rack gear 76 of the cam plate 27. The first connection gear 111 is engaged with a second connecting gear 113 rotatable supported by the lateral side plate section 13 via an arbor 114. The connecting shaft 114 is rotatably supported by spanning the space between the plate sections 13 and 14 as shown in FIGS. 7 and 8. A third connecting gear 115 is mounted in the vicinity of the opposite lateral side plate section 14 of the connecting plate 114. The third connection gear 115 is engaged with a fourth connecting gear 116 rotatably supported by the lateral side plate section 14 via an arbor 117. The fourth connecting gear 116 is engaged with the rack gear 76 of the opposite lateral side cam plate 28. The cam plates 27, 28 are moved by the loading motor 185 at the same speed and in the same direction in synchronized motion with each other.

The cam gear 97 is formed with a cam groove 98 surrounding the arbor 167. First and second actuating protrusions 99, 100 are formed in the vicinity of the outer rim of the major surface of the cam gear 97.

The cam groove 98 of the cam gear 98 surrounds the vicinity of the arbor 167 and describes a cam profile spaced apart from the arbor 167 over a limited angular extent. The cam groove 98 is engaged by a profiling pin 105 provided at the rear end of a lid opening/closing arm 104. The lid opening/closing arm 104 has its mid portion rotatably supported by a pivot 103 relative to the lateral plate section 13, while having its distal end protruded forwardly from the forward end of the floating chassis 12. The distal end portion of the lid opening/closing arm 104 acts as a lid opening/closing section 106.

Figure 28:
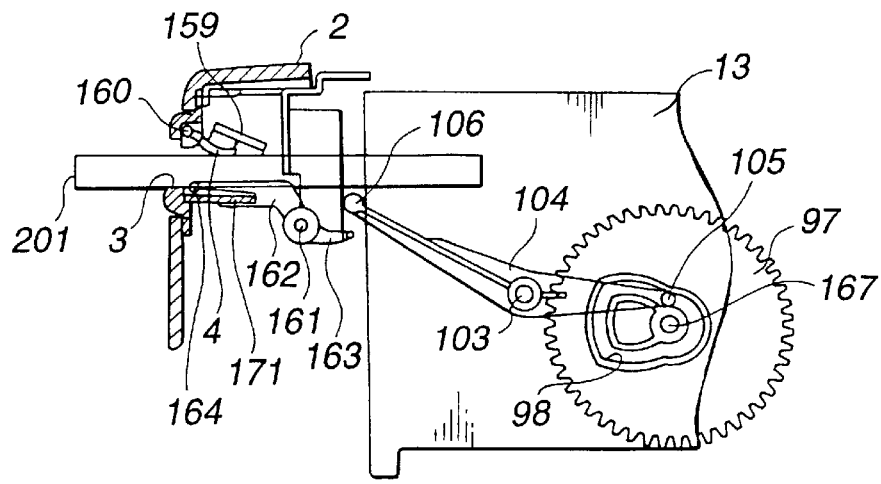
FIG. 28 is a schematic longitudinal cross-sectional view showing the construction of the vicinity of the disc cartridge insertion slit of the disc recording and/or reproducing apparatus according to the present invention.
Figure 29:
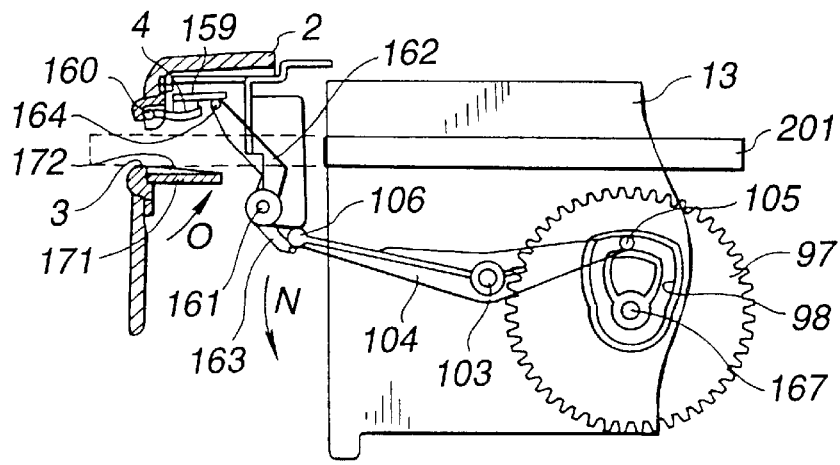
FIG. 29 is a schematic longitudinal cross-sectional view showing the state in which the disc cartridge inserting slit has been closed.
Figure 30:
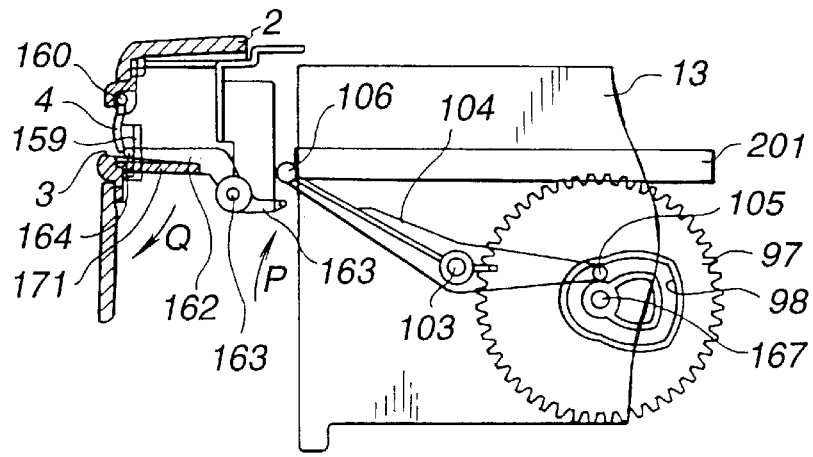
FIG. 30 is a schematic longitudinal cross-sectional view showing the state in which the inserting slit has been closed after loading the disc cartridge.

With rotation of the cam gear 97, the lid opening/closing arm 104 has its profiling pin 105 engaged with the area of the cam groove 98 spaced apart from the pivot 167, as shown in FIGS. 28 to 30. At this time, the lid opening/closing arm 104 is rotated in a direction of shifting the lid opening/closing section 106 downwards, as indicated by an arrow N in FIG. 29.

The lid 4 is rotatably supported by a pivot 160 relative to the front panel section 2. With the pivot 160 being arranged for extending along the upper edge of the lid 4, the lid 4 may be rotated in a direction in which the lower edge of the lid 4 is moved towards the inner side of the outer casing 1 as indicated by an arrow O in FIG. 29. Such rotation of the lid 4 results in the disc cartridge inserting slit 3 being opened. The lid 4 is rotationally biased by a torsion coil spring (not shown) in a direction of shifting its lower edge downwards. In the initial state, the lid 4 is maintained in the closed state with its rim abutting against the vicinity of the rim of the disc cartridge inserting slit 3. An actuating rod 159 constituting a lid opening/closing lever is mounted as one with a lateral side of the lid 4.

A transmission arm 162 constituting the lid opening/closing arm is rotatably mounted via a pivot 161 on the inner wall section of the front panel section 2. The transmission arm 162 is supported at its mid portion. In the initial state, the transmission arm 162 has a forward end transmission pin 164 positioned ahead of the actuating rod 159, while having a rear end portion 163 positioned below the lid opening section 106 of the lid opening/closing arm 104. When the opening/closing arm 104 is rotated in the direction of lowering the lid opening section 106, the lid opening section 106 thrusts the rear end portion 163 of the transmission arm 162 downwards for rotating the transmission arm 162, as shown in FIG. 29. As a result thereof, the actuating rod 159 is thrust from the forward side by the transmission pin 164 for opening the lid 4.

When the disc cartridge 201, 221 is introduced into the slit 3, the lid 4 is thrust by the disc cartridge 201 or 221 so as to be opened towards the inner side of the outer casing 1, as shown in FIG. 28. When the loading operation for the disc cartridge 201 or 221 is started, the lid 4 starts to be opened by the lid opening/closing arm 104 and the transmission arm 162, so that the lid 4 is prevented from being slidingly contacted with the disc cartridge 201 or 221, as will be explained subsequently.

A detection switch 101 is mounted on the lateral side plate section 13 in the vicinity of the cam gear 97. The detection switch 101 has a detection lever 102 rotatable mounted on its proximal end. In its initial state, the detection lever 102 is positioned at a mid position by a ring (not shown) enclosed within the inside of the detection switch 101. The detection switch 101 outputs detection signals for discrimination between the state in which the detection lever 102 has been rotated in one direction and the state in which the detection lever 102 has been rotated in the opposite direction. With the detection switch 101, the distal end of the detection lever 102 is intruded in the locus of movement of the first and second protrusions 99, 100 produced by the rotation of the cam gear 97. When the cam gear 97 is rotated clockwise in FIG. 7 to assume a pre-set angular position, the detection switch 101 is rotated in one direction by being thrust by the first actuating protrusion 99. Furthermore, when the cam gear 97 is rotated counterclockwise in FIG. 7 to assume a pre-set angular position, the detection switch 101 is rotated in the opposite direction by being thrust by the first actuating protrusion 100.

A guide visor 171 is mounted as one with the front panel 2 on the lower edge of the inserting slit 3 for extending from the one end towards the other end of the inserting slit 3. The upper surface of the guide visor 171 is formed with paired left and right guide ribs 172 extending in the fore and aft directions. The guide visor 171 is adapted for assuring sliding supporting contact with the bottom surface of the disc cartridge 201 or 221 which is intruded into and discharged out of the inserting slit 3.

Disc Cartridge Loading Operation

In the above-described disc recorder, the operation of loading the disc cartridge 201 or 221 into the disc driving block 147 is performed in the following manner. First, as shown in FIGS. 6 to 8, the cam plates 27 and 28 are brought to the foremost initial position. At this time, the foremost side supporting pins 32, 34 are positioned at the tear ends of the forward side cam grooves 73 and at the foremost parts of the third supporting slits 80, 83. The rear side supporting pins 33, 35 are positioned at the rear ends of the rear cam grooves 74 at the mid parts of the second supporting slits 81, 84. The actuating pin 45 is thrust and supported by the rear end of the engaging opening 75 for positioning the slide plate 31 at the forward side of the engaging opening 75. Thus the stop arm 68 has its stop shoulder 169 retained by the forward end of the stop wall section 85 for inhibiting rearward movement of the loading plate 29. The stop arm 68 has its abutment lug 69 abutted and supported on the abutment portion 65 of the insertion detection arm 62 so as to be thereby prevented from being rotated inwards. On the other hand, the lifting arm 119 has its profiling pin 120 supported by the head actuating cam groove 109 for holding the magnetic head 143 at its raised position with the mating operating portion 126 being thrust and supported by the actuating pin 154.

In the initial position the detection switch 101 has its detection lever rotated in the opposite direction by the second actuating protrusion 100, as shown in FIG. 7.

When the disc cartridge 201, 221 is inserted into the inserting slit 3, the disc cartridge 201, 221 thrusts the lid 4 inwards for opening the lid so that the distal end of the disc cartridge is introduced into the inside of the cartridge holder 30. At this time, the disc cartridge 201 or 221 has its side fitted with the shutter member 210 or 230 in register with the opposite lateral side of the cartridge holder 30.

Figure 9:
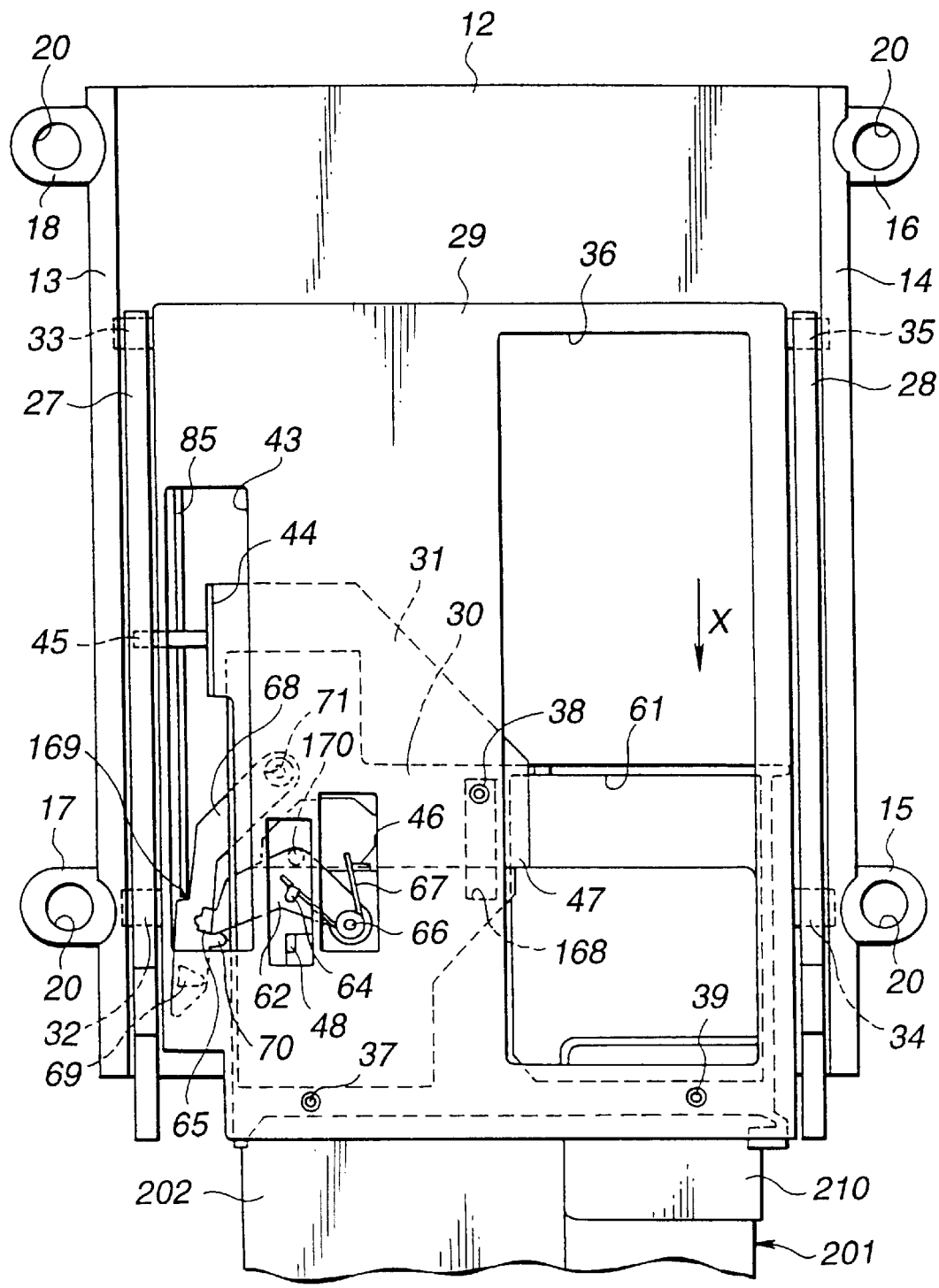
FIG. 9 is a plan view showing the state in which the disc cartridge has been introduced into the disc cartridge loading unit.

The disc cartridge 201 or 221 is introduced into the inside of the cartridge holder 30, as its mistaken insertion inhibiting protrusion 180 is intruded into the mistaken insertion inhibiting groove 220. The disc cartridge 201 or 221 thrusts the abutment pin 170 by its front side for rotating the insertion detection arm 62 rearward against the bias of the torsion coil spring 67, as shown in FIG. 9. The stop arm 68 is released from abutment on the abutment protrusion 69 by the abutment portion 65 and is free to be rotated inwards. At this time, the front end of the cartridge main body 202 or 222 is caused to bear against the forward edge of the mating thrusting part 47 of the slide plate 31.

When the disc cartridge 201 or 221 is introduced inwardly of the outer casing 1, the cam plates 27, 28 are rotated slightly rearward by the actuating pin 45 of the slide plate 31 thrusting the rear end of the engaging opening 75. This causes the cam gear 97 to be rotated clockwise in FIG. 7 to release the thrust so far exerted by the second actuating protrusion 100 on the detection lever 102 to set the detection lever 102 to its center position. When the detection lever 102 of the detection switch 101 is at the mid position, the loading motor 185 starts its driving operation, controlled by a controlling circuit (not shown) in a direction of shifting the cam plates rearward as indicated by the arrow Y in FIG. 7.

The shutter opening pawl 173 is intruded into the groove 209 of the cartridge main body 202 or 222 so as to be abutted on the distal end of a lug 212. The shutter closing pawl 56 is intruded into the engaging opening 211.

Figure 10:
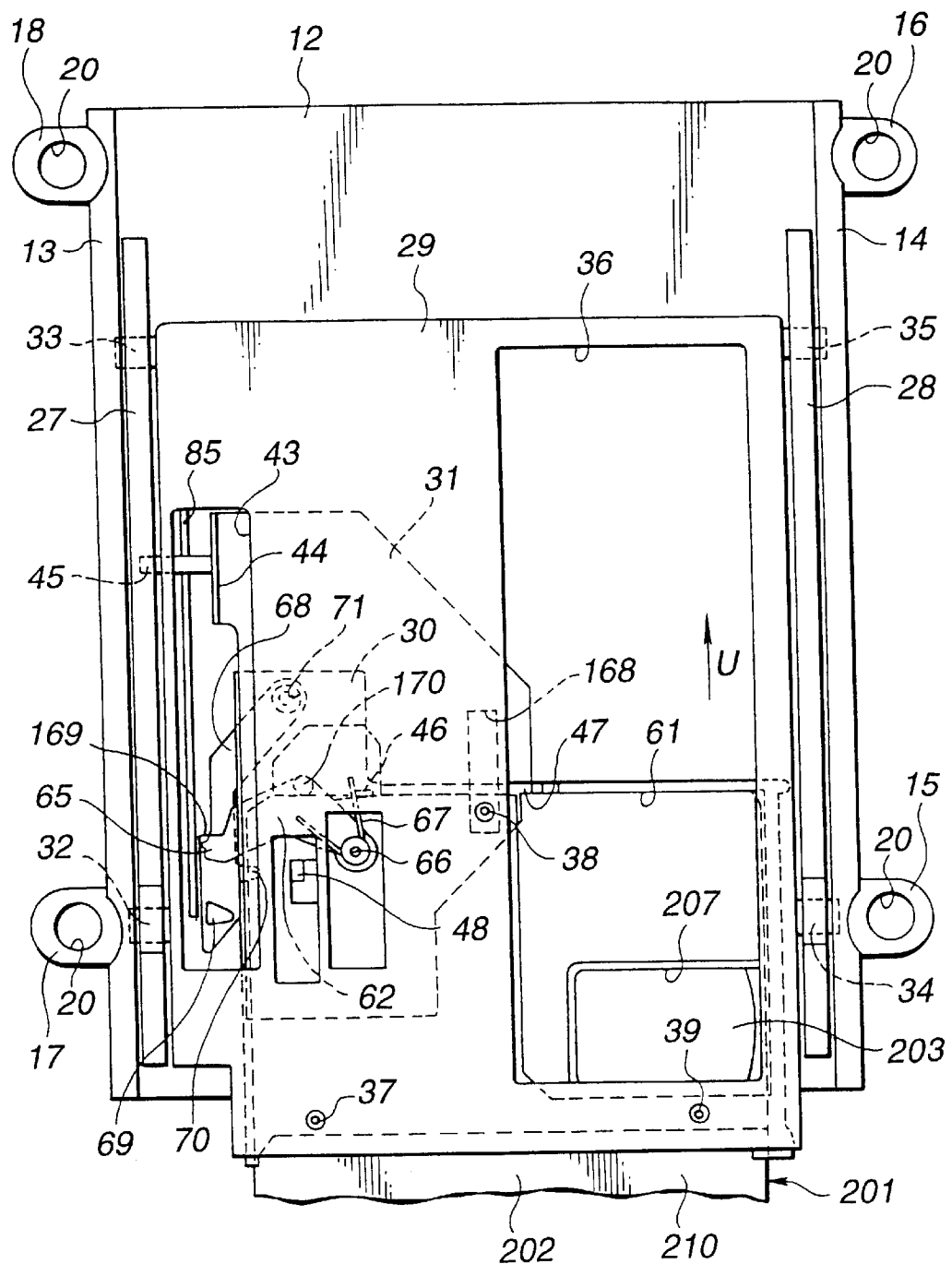
FIG. 10 is a plan view showing the state in which the disc cartridge has started to be introduced into the disc cartridge loading unit.
Figure 11:
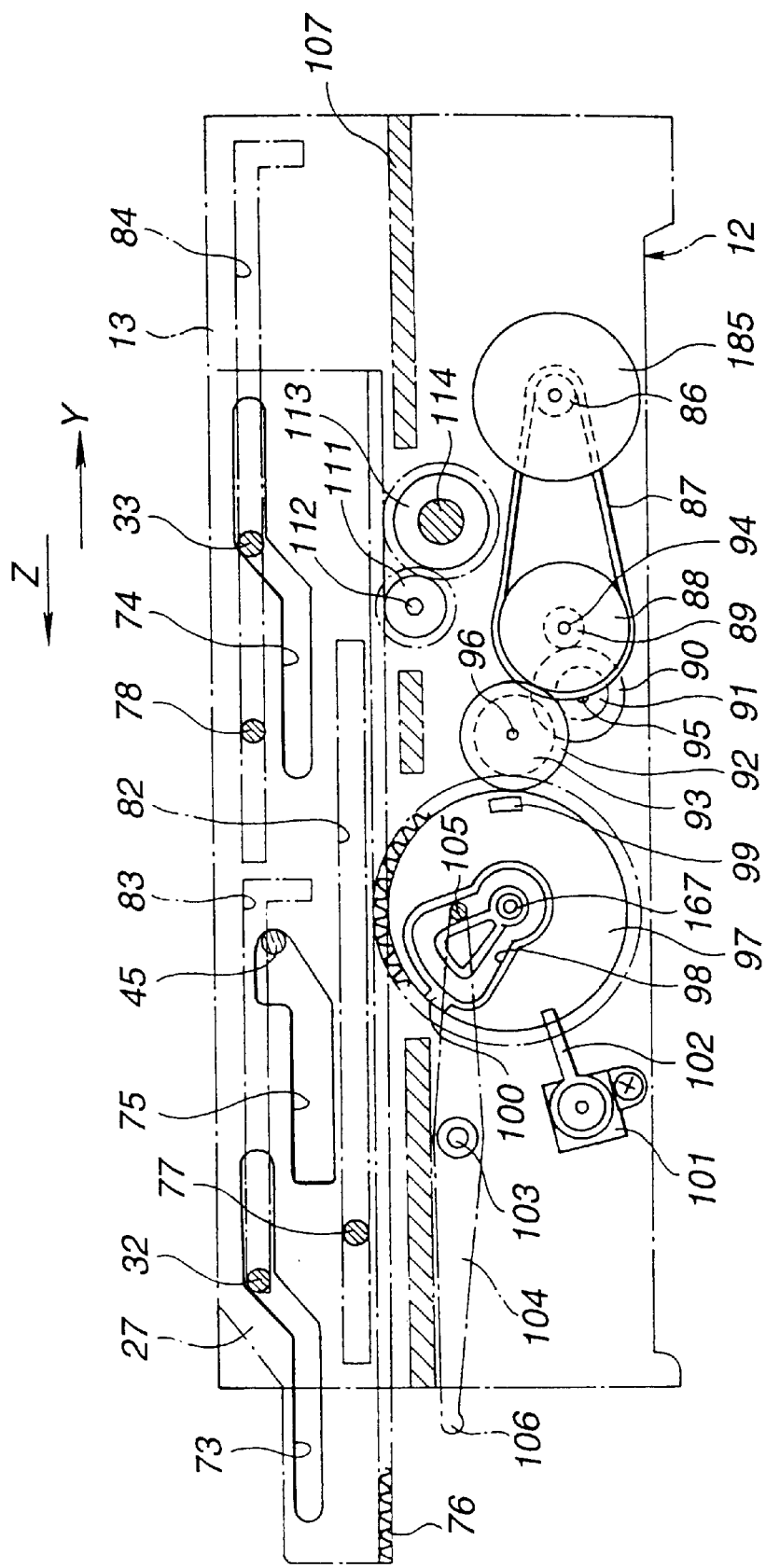
FIG. 11 is a side view showing a partial structure of one lateral side of the disc cartridge loading unit in such state in which the disc cartridge has been introduced into the disc cartridge loading unit.
Figure 12:
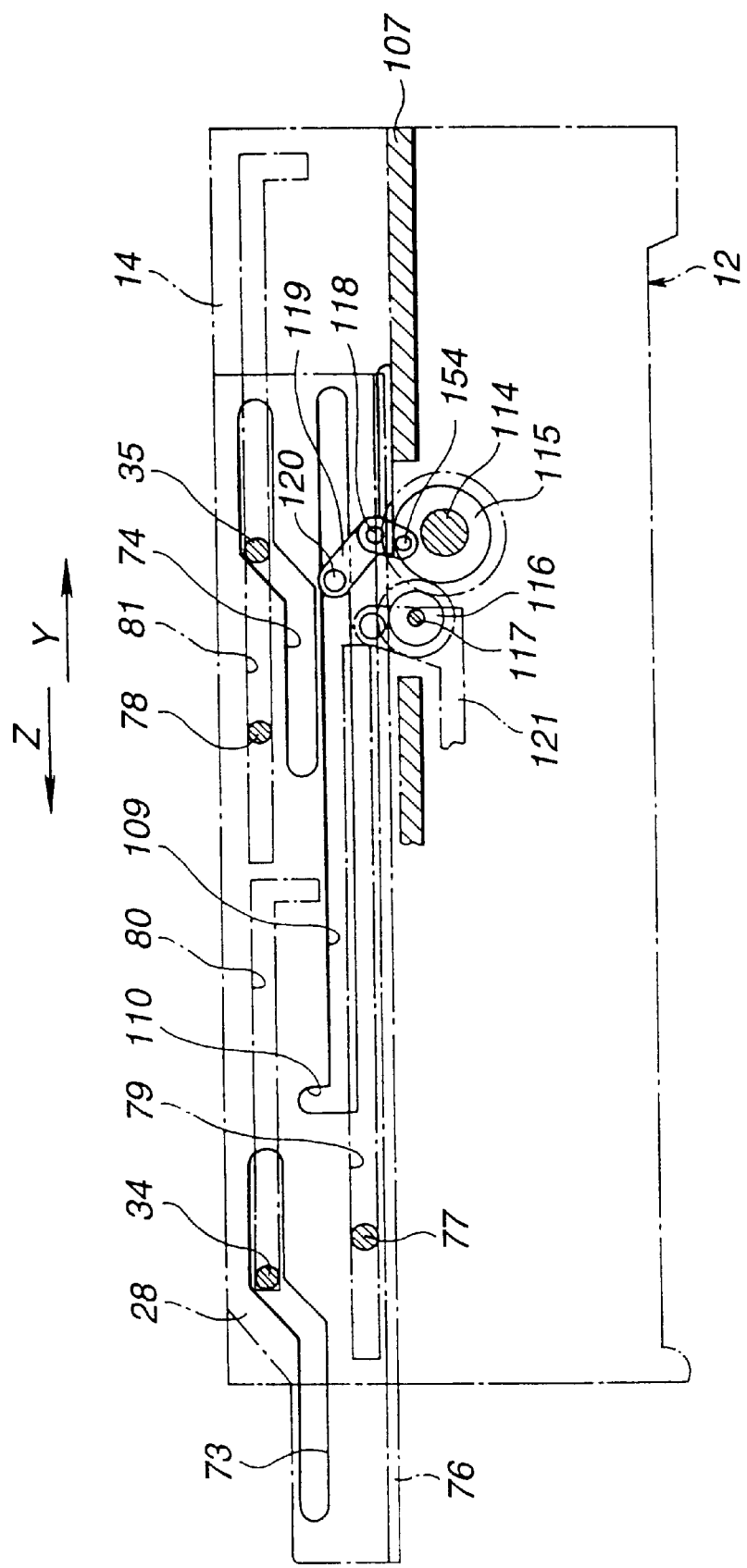
FIG. 12 is, a side view showing a partial structure of the opposite lateral side of the disc cartridge loading unit in such state in which the disc cartridge has been introduced into the disc cartridge loading unit.

When the loading motor 185 starts to be driven for shifting the cam plates 27, 28 rearward, the slide plate 31 is moved rearward as indicated by an arrow U in FIG. 10 so as to follow up with the cam plates 27, 28, as shown in FIGS. 10 to 12. The loading plate 29 is biased forwards relative to the slide plate 31 under the bias of the tension coil spring 49 and hence is not moved rearward. That is, the cam plates 27, 28 and the slide plate 31 are moved rearward, with the loading plate 29 remaining stationary relative to the floating chassis. Consequently, the forward side cam groove 73 is moved rearward, with the forward side supporting pins 32, 34 remaining at the forward ends of the third supporting slits 80, 83. On the other hand, the rear side groove, 74 is moved rearward, with the rear side supporting pins 33, 35 remaining at the mid parts of the second supporting slits 81, 84.

The actuating pin 45 remains thrust against the rear end of the engaging opening 75 under the bias of the tension coil spring 49. As the slider plate 31 is moved rearward, the stop arm 68 is rotated towards the inner side of the stop wall section 85, with the stop shoulder 169 being kept in sliding contact with the foremost end of the stop wall section 169. With the rotation towards the inner side of the stop arm 68, the latter has its engaging protrusion 70 engaged in an engaging recess 218 of the cartridge main body 202 or 222.

On the other hand, the shutter member 210 or 230 is retained at a position in which the distal end of the lug 212 is abutted against the shutter opening pawl 173, with the aperture 207 being opened with the movement towards rear of the cartridge main body 202 or 222.

Meanwhile, the head lifting arm 119 has its profiling pin 120 still supported in the head actuating groove 109 and thrusts the mating operating portion 126 by the actuating pin 154 for holding the magnetic head 143 at an elevated position.

The slide plate 31 is moved under the bias of the torsion coil spring 49 to a position in which the forward end face of the cartridge main body 202 or 222 is abutted against the positioning wall section 61, that is, to a position in which the mating thrusting member 47 is flush with the positioning wall section 61 in a manner of following the movement of the cam plates 27, 28. At this time, the cam grooves 73, 74 are at the position in which the supporting pins 32 to 35 are passed through the connecting point between the horizontal section and the inclined section at the rear side, that is the rear end of the inclined section, as shown in FIG. 11. The relative position between the disc cartridge 201 or 221 and the slide plate 31 is maintained at this time by the engaging projection 70 of the stop arm 68 being engaged in the engaging recess 218 of the cartridge main body 202 or 222.

Figure 13:
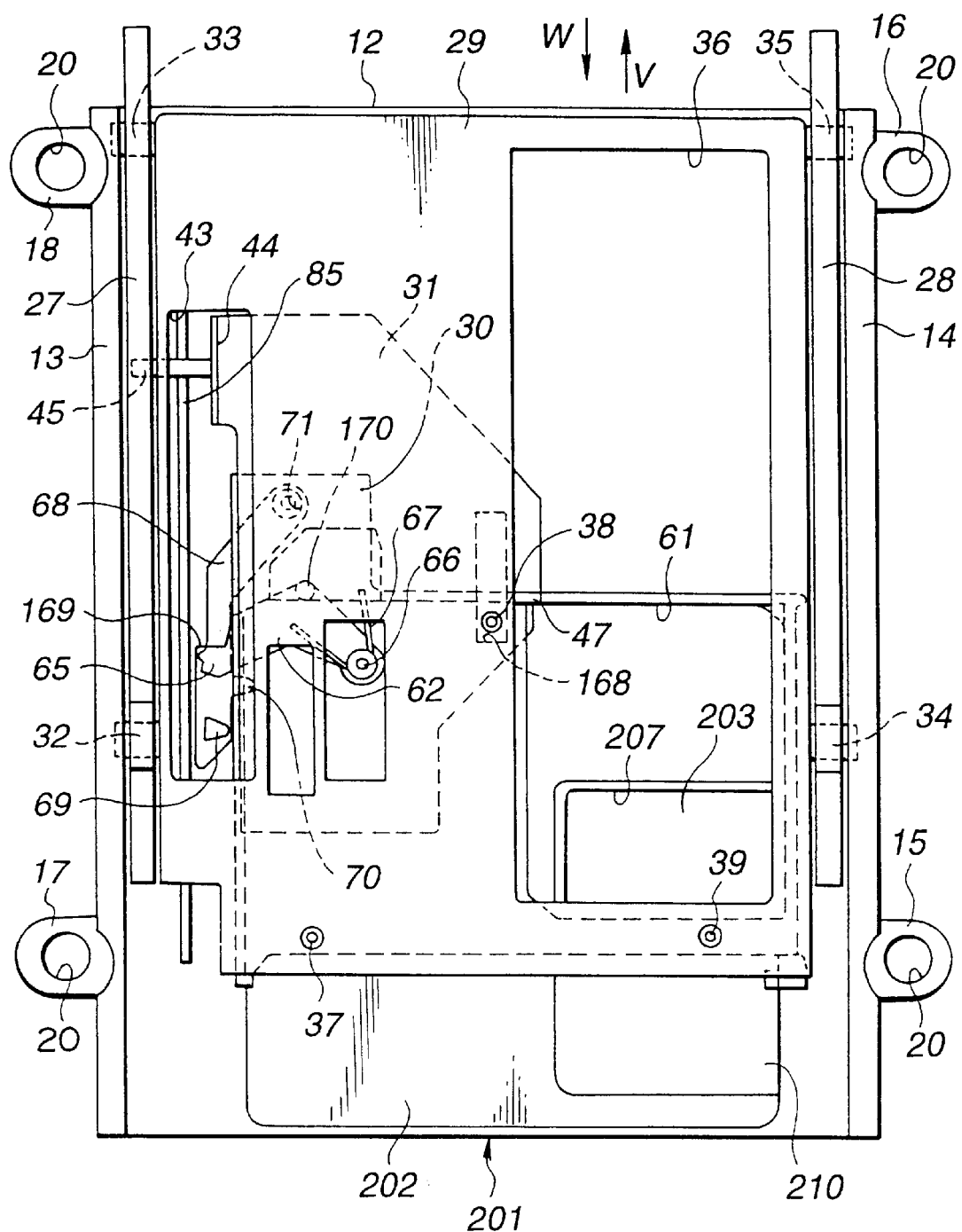
FIG. 13 is a plan view showing the state in which the disc cartridge has been inserted as far a rear end into the disc cartridge loading unit.
Figure 14:
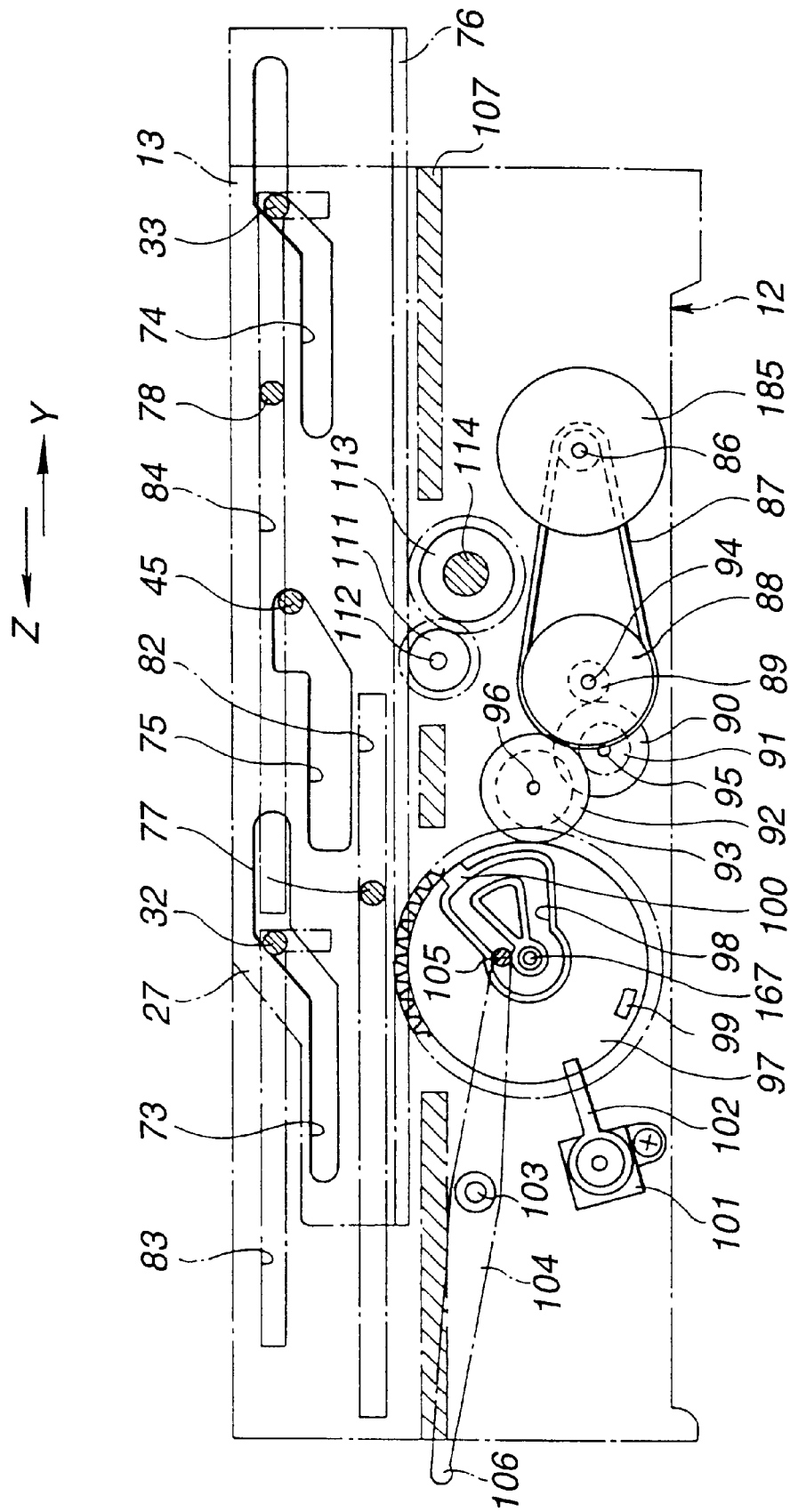
FIG. 14 is a side view showing a partial structure of one lateral side of the disc cartridge loading unit in such state in which the disc cartridge has been inserted as far as the rear end into the disc cartridge loading unit.
Figure 15:
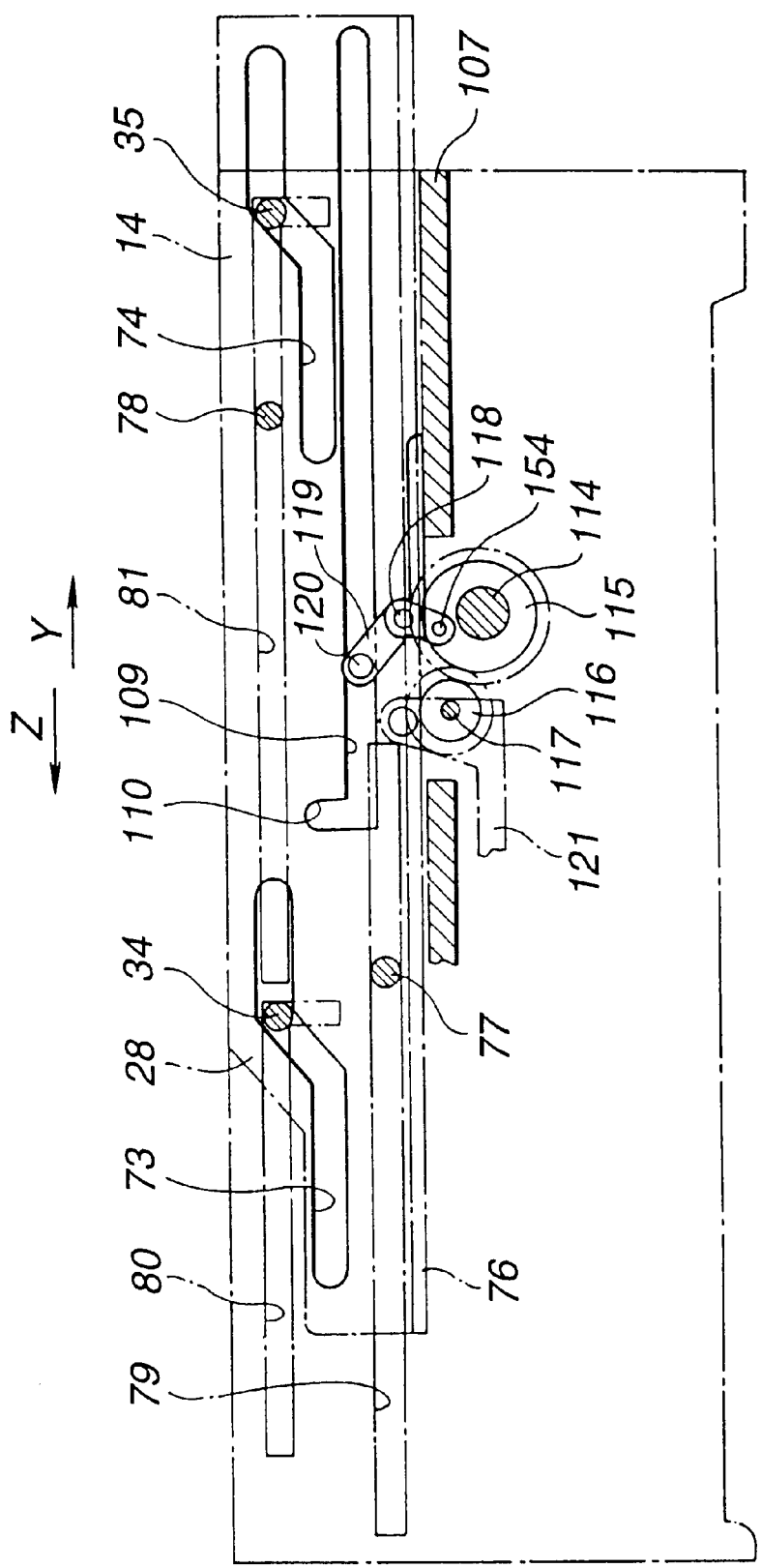
FIG. 15 is a side view showing a partial structure of the opposite lateral side of the disc cartridge loading unit in such state in which the disc cartridge has been inserted as far as the rear end into the disc cartridge loading unit.

When the cam plates 27, 28 are moved rearward by the loading motor 185, the loading plate 29 is moved rearward, as shown in FIGS. 13 to 15, while the relative position between the slide plate 31 and the loading plate 29 is maintained, that is, the cam plates 27, 28 are moved towards the rear while the supporting pins 32 to 35 remain introduced through the connecting point between the rear horizontal section and the inclined section of each of the cam grooves 73, 74. The relative position between the loading plate 29 and the slide plate 31 is maintained under the bias of the tension coil spring 49. The supporting pins 32 to 35 are moved up to the rear ends of the second and third supporting slits 80 to 84 along with the loading plate 29. The disc cartridge 201 or 221 is transported at this time in the horizontal direction from the upper forward position of the disc drive block 147 shown in FIG. 22 to the position directly overlying the disc drive block 147 shown in FIG. 23. The disc cartridge 201 or 221 is intruded at this time into a space above the optical pickup unit 148 and below the magnetic head 143, that is a space between the optical pickup unit 148 and the magnetic head 143.

During the time when the disc cartridge 201 or 221 is transported in tis manner in the horizontal direction, the profiling, pin 105 of the lid opening/closing arm 104 is moved through a domain spaced apart from the pivot 167 of the cam groove 98, as shown in FIG. 29. This causes the opening/closing arm 104 to open the lid 4 via the transmission arm 162.

Meanwhile, the distance by which the floating chassis 12 may be moved in a direction of tensioning the damper 19 is limited by the damper 19. The reason is that, if the floating chassis 12 is moved upwards by more than a pre-set distance, there arises the risk that, even if the arm 104 is rotated by the cam gear 97, the lid opening/closing arm 104 is unable to open the lid 4. That is, the distance by which the floating chassis 12 may be moved upwards is set to a value only barely sufficient to open the lid 4 reliably when the floating chassis 12 is moved upwards to the maximum extent possible.

Figure 16:
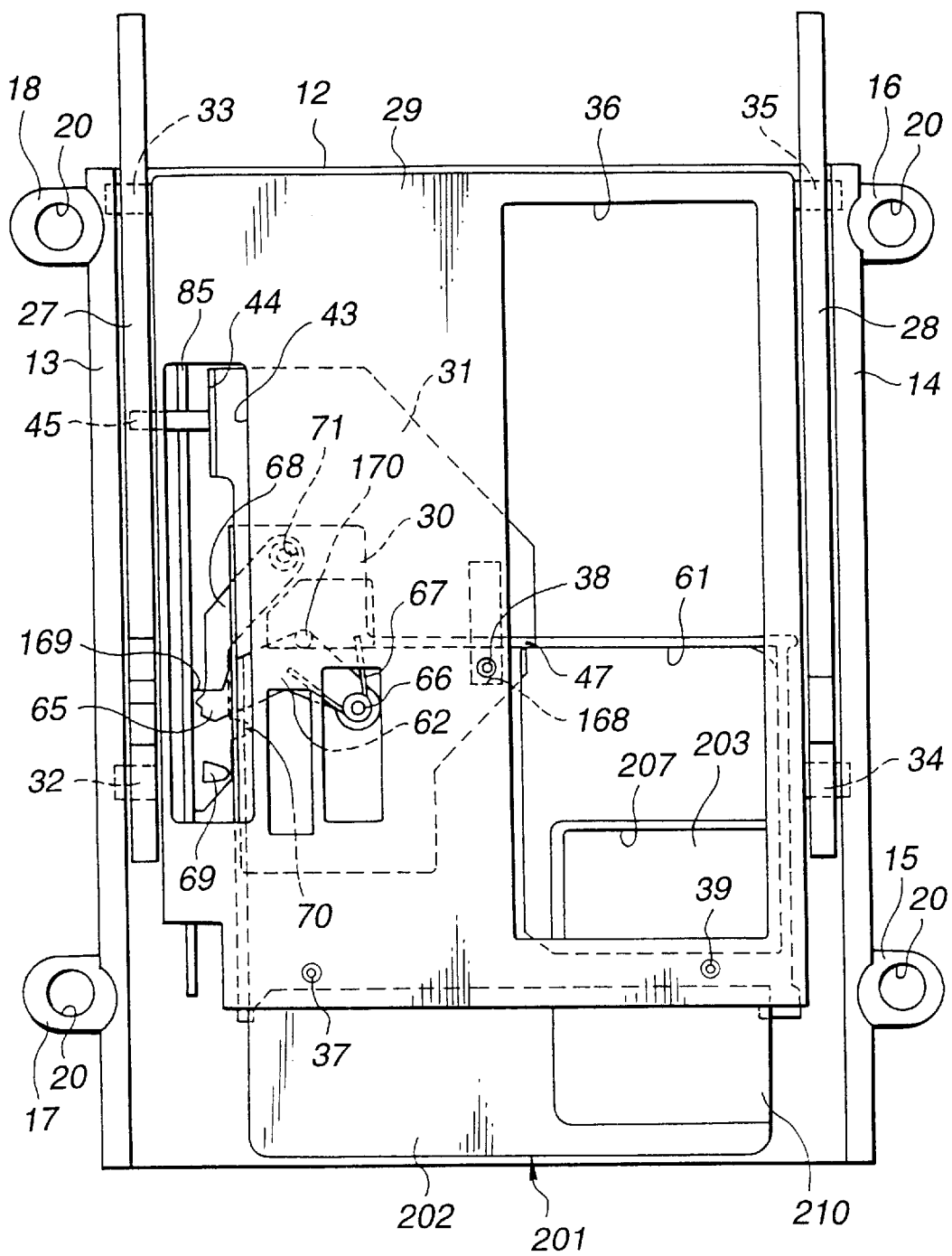
FIG. 16 is a plan view showing the state in which the loading of the disc cartridge by the disc cartridge loading unit is terminated in readiness for reproduction.
Figure 17:
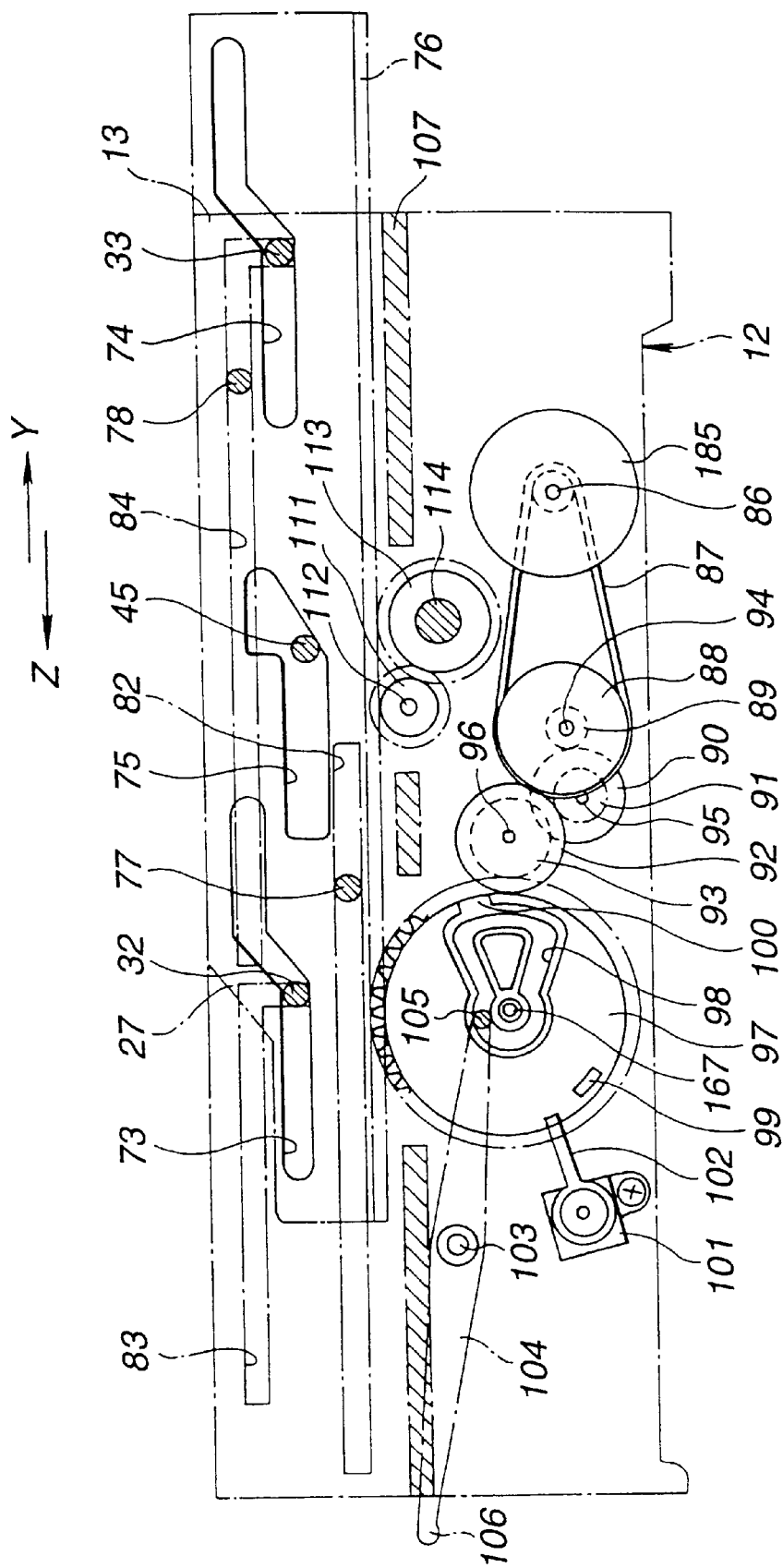
FIG. 17 is a side view showing a partial structure of one lateral side of the disc cartridge loading unit in which the loading of the disc cartridge by the disc cartridge loading unit is terminated in readiness for reproduction.
Figure 18:
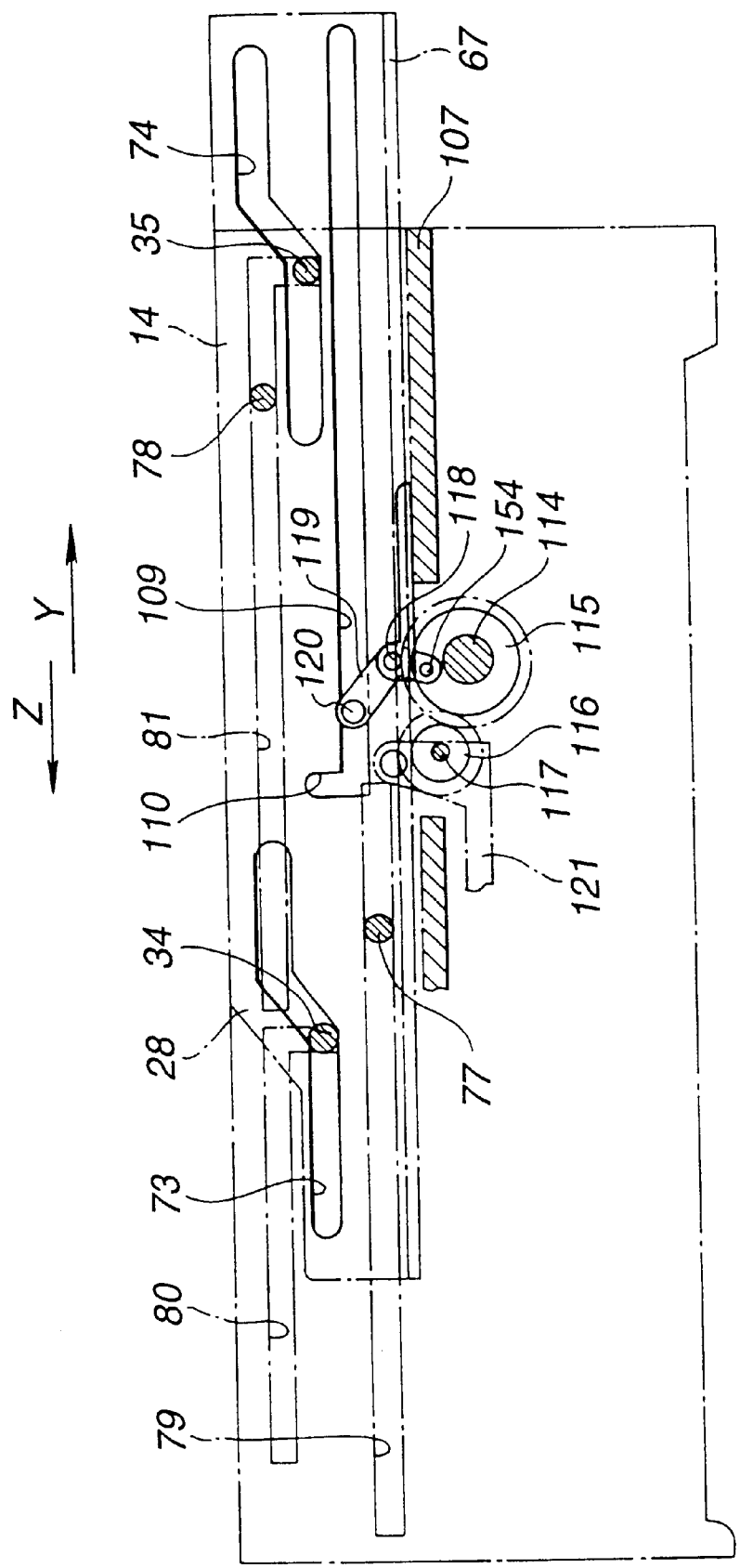
FIG. 18 is a side view showing a partial structure of the opposite lateral side of the disc cartridge loading unit in which the loading of the disc cartridge by the disc cartridge loading unit is,terminated in readiness for reproduction.

When the cam plates 27, 28 are moved further rearward by the loading motor 185 the loading plate 29 is moved downward in a direction of approaching the disc drive block 147, while the relative position between the loading plate and the slide plate 31 is maintained, as shown in FIGS. 16 to 18. At this time, since the supporting pins 32 to 35 are positioned at the rear ends of the supporting pins 80 to 84, the loading plate 29 cannot be moved further rearward. The result is that if the cam plates 27, 28 are moved rearward, the supporting pins 32 to 35 are positioned at the points of intersection between the inclined sections of the cam grooves 73, 74 and the downwardly bent rear end portions of the second and third supporting slits 80, 81, 83, 84 so that the loading plate 29 is moved downwards. At this time, the actuating pin 45 is positioned halfway in the engaging opening 75. The disc cartridge 201 or 221 is loaded on the base block 130 of the disc drive block 147 in position by the positioning pins 156, 157, as shown in FIGS. 24 to 27. At this time, the magneto-optical disc 203 or the optical disc 223 is set and loaded on the disc table 149. The loading plate 29 thrusts and supports the disc cartridge 201 or 221 on the base block 130.

When the disc cartridge 201 or 221 is loaded on the base block 130, the completion of loading of the disc cartridge 201 or 221 is detected by the detection switch mounted on the base block 130. When the completion of loading of the disc cartridge 201 or 221 is detected, the loading motor 185 is halted by the operation of the controlling circuit.

In this state, the information signals may be read by the optical pickup unit 148 from the magneto-optical disc 203 or the optical disc 223 by the optical pickup unit 148. That is, the playback mode may now be executed. The playback mode is executed on thrusting the playback button 8, whereby the magneto-optical disc 203 or the optical disc 223 as set on the disc table 149 is rotated by the spindle motor for reading out the information signals by the optical pickup unit 148.

Figure 19:
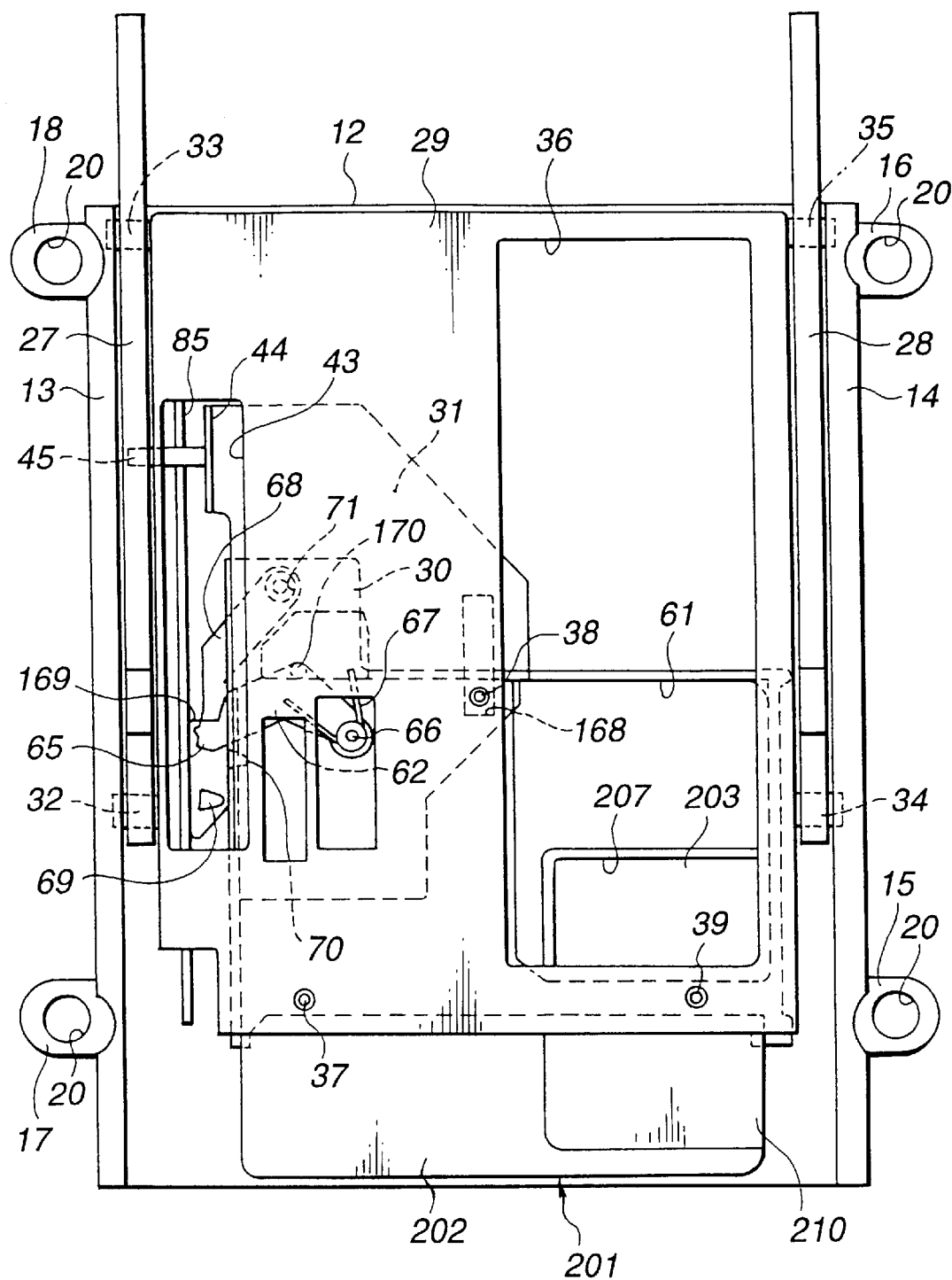
FIG. 19 is a plan view showing the recording state of the disc cartridge loading unit.
Figure 20:
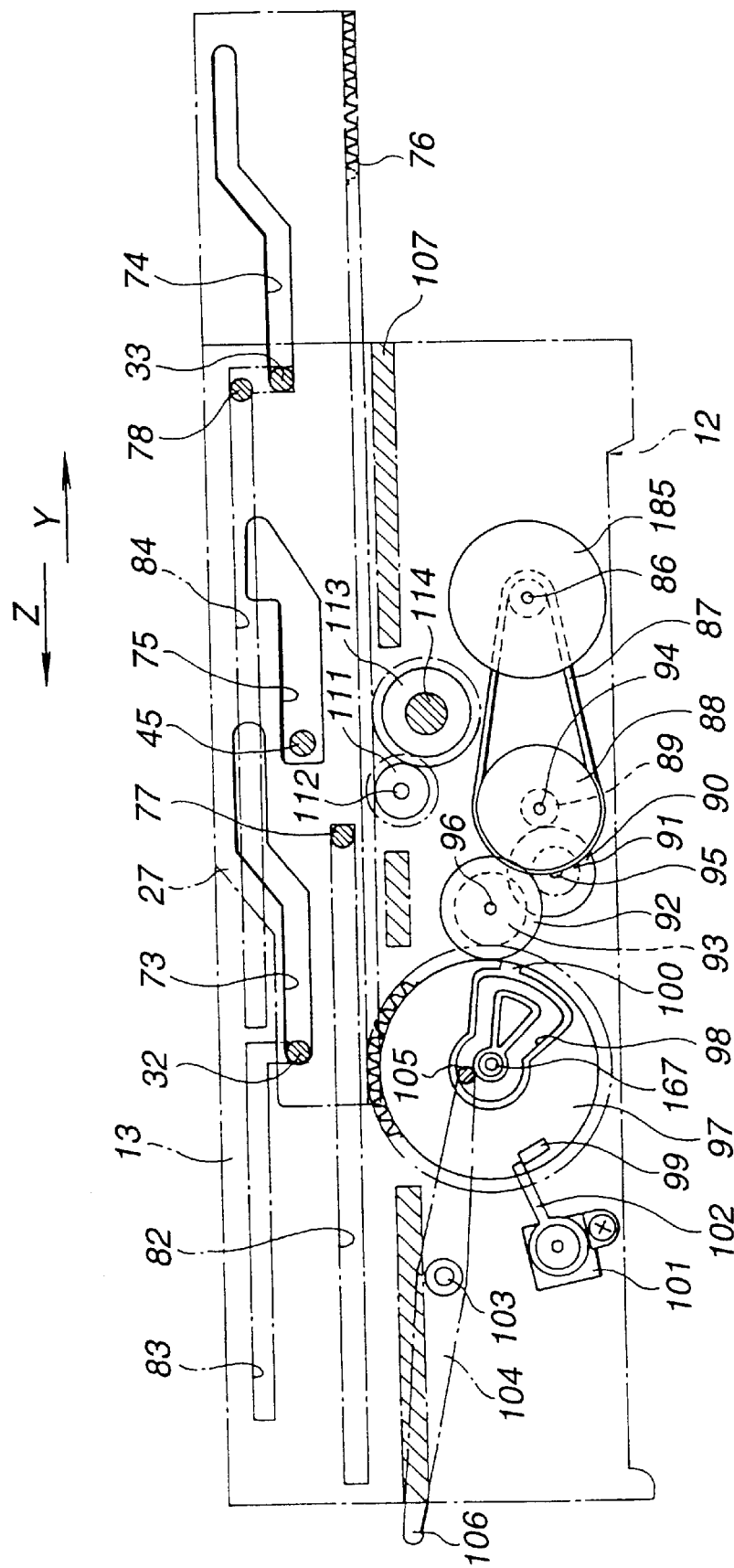
FIG. 20 is a side view showing a partial structure of one lateral side of the disc cartridge loading unit in the recording state.
Figure 21:
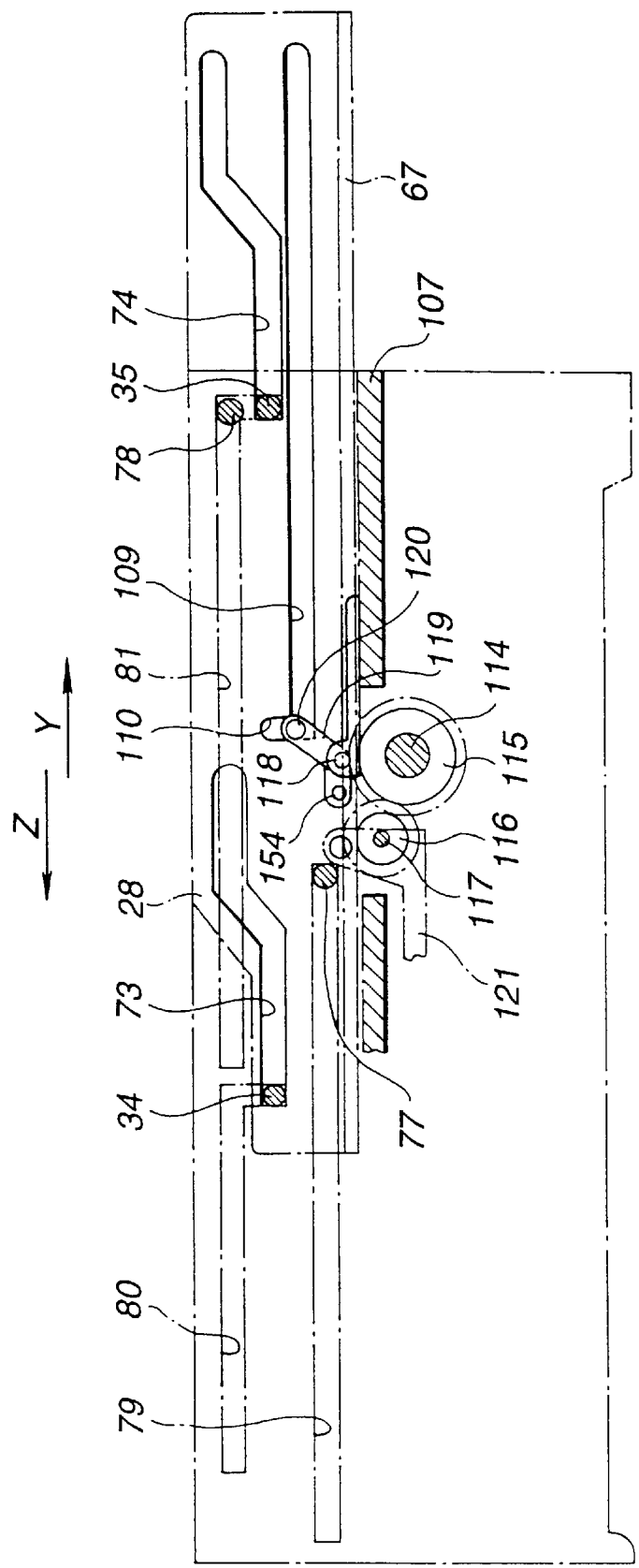
FIG. 21 is a side view showing a partial structure of the opposite lateral side of the disc cartridge loading unit in the recording state.

If the recording button 10 is thrust for instructing the execution of the recording mode, the loading motor 185 causes the cam plates 27, 28 to be moved further rearward. The cam plates 27, 28 cause the supporting pins 32 to 35 to be moved to the positions at the foremost part of the forward horizontal sections of the cam grooves 73 and 74, as shown in FIGS. 19 to 21. The detection switch 101 is rotated in one direction by the detection rod 102 being thrust by the first actuating protrusion 99, as shown in FIG. 20. With such rotation of the detection rod 102, the loading motor 185 is halted by the controlling circuit.

Figure 25:
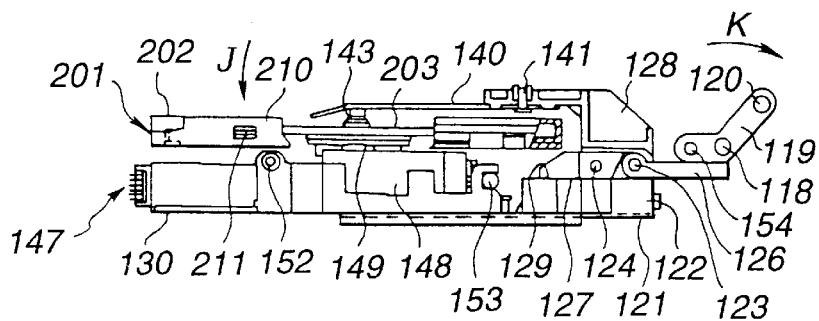
FIG. 25 is a side view showing the state in which the disc cartridge has been transported onto the disc drive in readiness for recording.

The head lifting arm 119 is rotated at this time in a direction shown by an arrow K in FIG. 25 by the profiling pin 120 being intruded into the head actuating section 110, as shown in FIG. 21. The result is that the thrusting support of the mating operating portion 126 by the operating pin 154 is released to permit the magnetic head 143 to be moved downwards. The head arm 128 is rotated under the bias of the torsion coil spring 132 as far as a position in which the abutment portion 127 is abutted against the height reference 129. By such rotation of the head arm 128, the magnetic head 143 is brought into sliding contact with the magneto-optical disc 203 as loaded on the disc table 149. The magnetic head 143 is brought at this time into sliding contact with the major surface of the magneto-optical head 203 under a pre-set pressure under the resiliency of the gimbal spring 203, as shown by an arrow J in FIG. 25.

In this state, the recording mode may be executed, that is, information signals may be written by the optical pickup unit 148 and the magnetic head 143 on the magneto-optical disc 203. The recording mode is executed by the magneto-optical disc 203 as set on the disc table 149 being rotated by the spindle motor to permit the information signals to be written thereon by the optical pickup unit 148 and the magnetic head 143.

If, during the playback mode or the recording mode, or during the stop mode with the stop button 9 being actuated to halt the operation of the spindle motor, the ejection button 5 is actuated, the disc cartridge 201 or 221 is ejected outward via the inserting slit 3.

Figure 23:
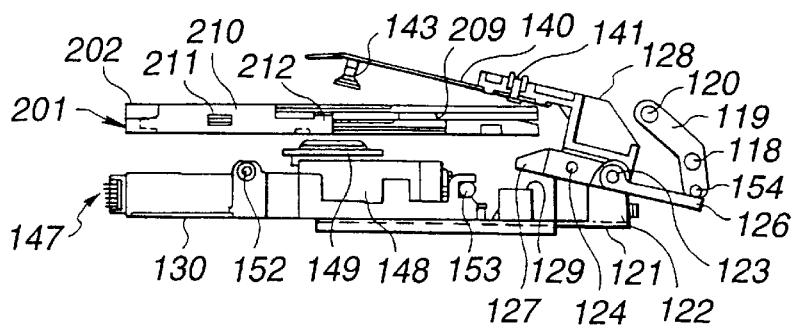
FIG. 23 is a side view showing the state in which the disc cartridge has been transported onto the disc drive.
Figure 24:
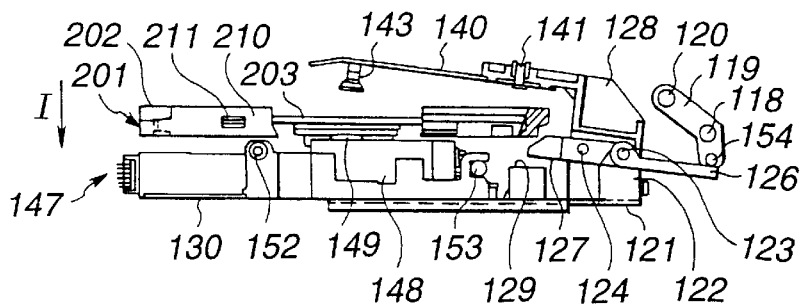
FIG. 24 is a side view showing the state in which the disc cartridge has been transported onto the disc drive in readiness for reproduction.

That is, if the ejection button 5 is actuated, the loading motor 185 is driven in the direction of driving the cam plates 27 and 28 in a forward direction as shown in FIG. 17 or as indicated by the arrow Z in FIG. 20. If, after the execution of the recording mode, the ejection button 5 is not actuated, the profiling pin 120 of the head lifting arm 119 is returned into the inside of the head actuating cam groove 109 by the forward movement of the cam plates 27 and 28. The magnetic head 143 is moved to an upper position in which the magnetic head 143 is spaced apart from the magneto-optical disc 203 by the actuating pin 154 thrusting and supporting the mating operating portion 126. The supporting pins 32 to 35 are positioned at the points of intersection between the inclined sections of the cam grooves 73 and 74 and the rear downwards bends of the second and third supporting slits 80, 81, 83, 84 by the forward movement of the cam plates 27 and 28. As a result thereof, the loading plate 29 is moved upwards away from the head drive block 147. Consequently, the disc cartridge 201 or 221 is floated above the disc drive block 147, as shown in FIG. 23.

When the cam plates 27, 28 are moved further forwards by the loading motor 185, the loading plate 29 is moved forwards while the relative position thereof with respect to the slide plate 31 is maintained, as shown in FIGS. 10 to 12. That is, the cam plates 27, 28 are moved forwards with the supporting pins 32 to 35 remaining inserted in the connecting points between the rear horizontal sections and the inclined sections of the cam grooves 73 and 74. The relative position between the loading plate 29 and the slide plate 31 is maintained at this time under the bias of the tension coil spring 49. The supporting pins 32 to 35 are moved, along with the loading plate 29, as far as the foremost ends of the second and third supporting pins 80, 81, 83 and 84. The disc cartridge 201 or 221 is transported horizontally from the position directly overlying the disc drive block 147, as shown in FIG. 23, as far as the upper forward position of the disc drive block 147, as shown in FIG. 22.

During the time when the disc cartridge 201 or 221 is transported horizontally in the forward direction, the profiling pin 105 is passed through a domain of the cam groove 98 which is spaced apart from the pivot 168, as shown in FIG. 29. This causes the lid opening/closing arm 104 to be opened via the transmission arm 162. The lid 4 remains opened until the rear portion of the cartridge main body 202 or 222 is protruded via the inserting slit 3 towards the front side of the front panel section 2 and thus is prevented from being abutted against the rear portion of the cartridge main body 202 or 222. After the rear portion of the cartridge main body 202 or 222 is protruded towards the front side of the front panel section 2, the lid 4 is kept opened by the cartridge main body 202 or 222.

When the forward supporting pins 32, 34 reach the foremost parts of the third slits 80, 83 by the forward movement of the cam plates 27, 28, as shown in FIGS. 10 to 12, the loading plate 29 is unable to move further forwards and thus is at a standstill. The cam plates 27, 28 are moved further forwards to thrust the 2Q operating pin 45 forwards by the rear edge of the engaging opening 75, as shown in FIGS. 7 to 9, for shifting the slide plate 31 forwards against the bias of the tension coil spring 49, as indicated by the arrow X in FIG. 9. That is, the cam plates 27 and 28 and the slide plate 31 are moved forwards, with the loading plate 29 being kept in the halted state relative to the floating chassis 12. Consequently, the forward cam groove 73 is moved forwards, with the forward side supporting pins 32, 34 being positioned at the forward ends of the third supporting slits 80 and 83. On the other hand, the rear cam grooves 74 are moved forwards, with the rear supporting pins 33 and 35 being positioned at the mid part of the second supporting slits 81 and 84.

By such forward movement of the slide plate 31, the disc cartridge 201 or 221 is thrust by the mating thrusting member 47 so as to be detached from the positioning wall section 61 and moved forwards relative to the cartridge holder 30.

By the slide plate 31 being moved forwards, the stop arm 68 is rotated outward, with the stop shoulder 169 being positioned more forwardly than the forward end of the stop wall section 85, as shown in FIG. 9. When rotated outward in this manner, the stop arm 168 causes the stop shoulder 169 to be engaged with the foremost part of the stop wall 85. The shutter member 210 or 230 is kept at a position in which the shutter closing pawl 56 is engaged in the engaging hole 211, with the aperture 207 being closed with the forward movement of the cartridge main body 202 or 222.

When the cam plates 27, 28 are moved to the forward position, as the initial position, the supporting pins 32 to 35 are introduced into the rear ends of the cam grooves 73, 74, as shown in FIGS. 7 and 8. The detection switch 101 is rotated at this time towards the opposite lateral side by the detection rod 102 being thrust by the second actuating protrusion 100. When the detection rod 102 of the detection switch 101 is rotated in one direction, the loading motor 185 is stopped by the controlling circuit.

When the disc cartridge 201 or 221 is taken out in the forward direction, as shown in FIG. 6, the detection arm 62 is reset to its initial position by being rotated under the bias of the torsion coil spring 67. Simultaneously, the abutment protrusion 69 is supported by the abutment portion 65 for inhibiting inward rotation of the stop arm 68. When the disc cartridge 201 or 221 is to be taken out forwards, the shutter closing pawl 56 causes the shutter member 210 or 230 to be closed, after which the shutter closing pawl 56 is rotated outward so as to be extricated from the engaging opening 211.

What is claimed is:

1. A recording and/or reproducing apparatus for a recording disc comprising:

a casing;

a first chassis affixed to the casing and having portions extending within the casing which are spaced apart from the casing;

a second chassis floatingly supported relative to said portions of the first chassis via dampers and housed within said casing;

a disc loading unit and a disc drive unit arranged on said second chassis;

a disc inserting slit formed in an outer wall of said casing, the disc inserting slit being configured to receive a recording medium for loading said recording medium on said disc drive unit;

a lid pivotally supported by said casing at a first pivot for opening and closing said disc inserting slit;

a transmission member, movably supported relative to said casing and mechanically coupled to said lid, said transmission member pivotally movable for opening and closing said lid; and an opening and closing member movably supported by said second chassis, said opening and closing member being moved in operative association with the loading operation by said disc loading unit, said opening and closing member being selectively coupled to said transmission member causing said transmission member to be moved when the opening and closing member is moved;

said opening and closing member being mechanically coupled to said transmission member for maintaining said lid in an opened state, via said transmission member, only during a preset interval of loading said recording medium into said disc loading unit, said opening and closing member otherwise being mechanically decoupled from said transmission member.

2. A recording and/or reproducing apparatus for a recording disc of claim 1, wherein:

the transmission member includes a transmission pin which slidingly engages the lid for opening and closing the lid.

3. A recording and/or reproducing apparatus for a recording disc of claim 1, wherein:

the transmission member is pivotally coupled to the casing.

4. A recording and/or reproducing apparatus for a recording disc of claim 1, wherein:

the lid is pivotally supported by said casing at a first pivot for opening and closing said disc inserting slit; and the transmission member is movably supported relative to said casing at a second pivot, the second pivot being spaced apart from the first pivot.

* * * * *

UNITED STATES PATENT AND TRADEMARK OFFICE
CERTIFICATE OF CORRECTION

PATENT NO. : 6,404,719 B1
DATED : June 11, 2002
INVENTOR(S) : Yutaka Fukuyama et al.

It is certified that error appears in the above-identified patent and that said Letters Patent is hereby corrected as shown below:

Column 1,
Line 5, change "aband" to -- abandoned --;
Line 36, change "presentrecording" to -- present recording --;
Line 51, change "f or" to -- for --.

Column 5,
Line 5, delete "," after "magnetic";
Line 56, change "is,terminated" to -- is terminated --.

Column 6,
Line 38, change "sown" to -- shown --;
Line 39, change "A" to -- a --;
Line 65, insert -- ON/OFF -- after "source".

Column 9,
Line 13, delete "supporting lugs 17 18";
Line 14, after "of" add -- supporting lugs 17, 18 --;
Line 66, change "Slit" to -- to -- slit --.

Column 12,
Line 57, change "h as" to -- has --.

Column 13,
Line 10, insert -- 12 -- between "chassis" and "and".

Column 14,
Line 2, please change "portioning" to -- positioning --;
Line 21, please change "get" to -- set --.

Column 15,
Line 25, change "be-positioned" to -- be positioned --.

UNITED STATES PATENT AND TRADEMARK OFFICE
CERTIFICATE OF CORRECTION

PATENT NO. : 6,404,719 B1
DATED : June 11, 2002
INVENTOR(S) : Yutaka Fukuyama et al.

It is certified that error appears in the above-identified patent and that said Letters Patent is hereby corrected as shown below:

Column 16,
Line 28, change "Adjustment" to -- adjustment --;
Line 30, delete "," after "along";
Line 65, change "rotatable" to -- rotatably --.

Column 17,
Line 5, ".112" to -- 112 --;
Line 8, change "rotatable" to -- rotatably --.

Column 20,
Line 50, delete "," after "profiling".

Column 22,
Line 24, change "downwards" to -- downward --.

Signed and Sealed this

Twenty-second Day of April, 2003

JAMES E. ROGAN
*Director of the United States Patent and Trademark Office*